Figure 1:
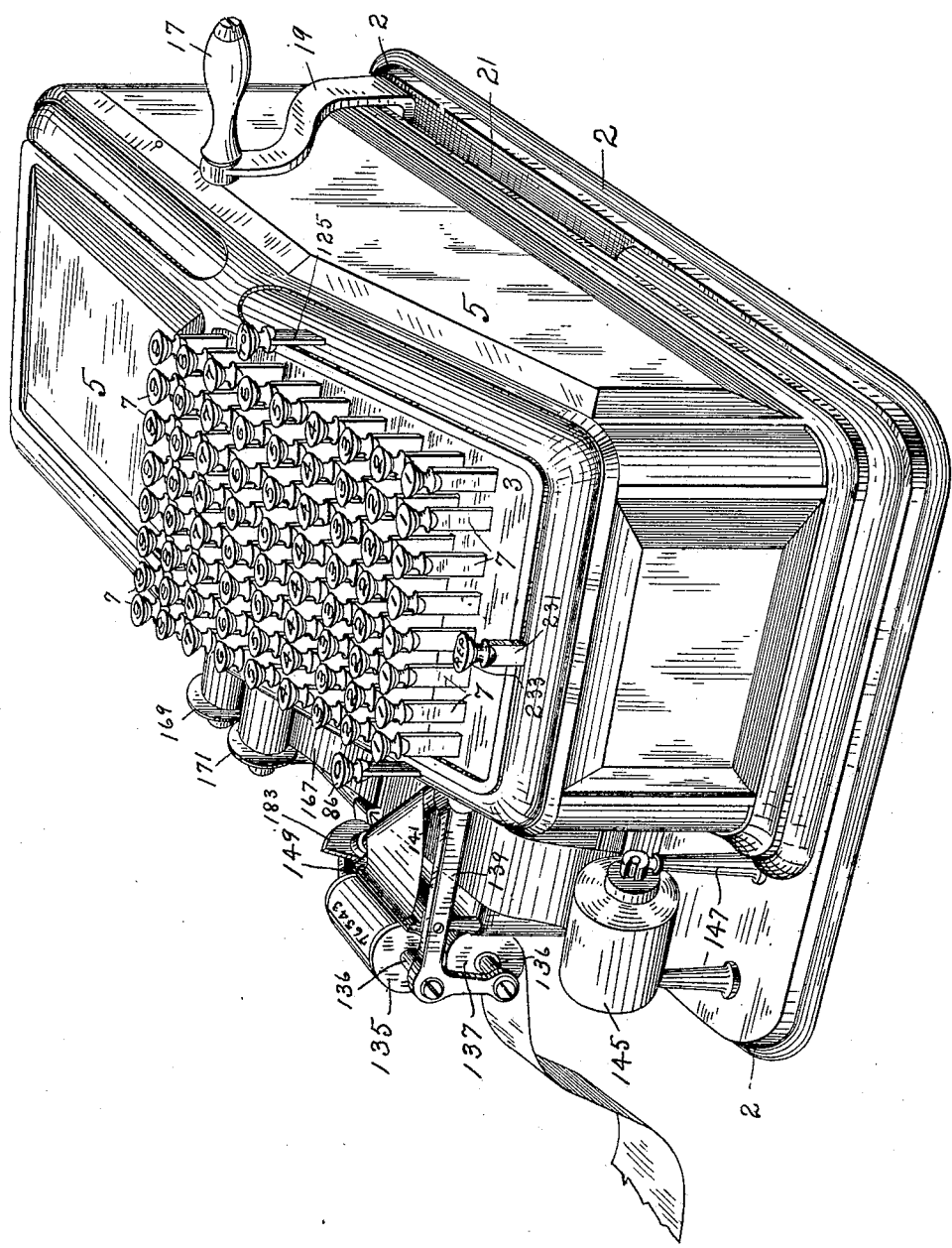

No. 647,238. Patented Apr. 10, 1900.
W. P. SHATTUCK.
COMPUTING AND LISTING MACHINE.
(Application filed Sept. 8, 1899.)
(No Model.) 14 Sheets—Sheet 1.

Witnesses
C. F. Kilgore
Richard Paul

Inventor
William P. Shattuck
By his Attorneys
Paul & Hawley

No. 647,238. Patented Apr. 10, 1900.
W. P. SHATTUCK.
COMPUTING AND LISTING MACHINE.
(Application filed Sept. 8, 1899.)

(No Model.) 14 Sheets—Sheet 2.

Witnesses
C. F. Kilgore
Richard Paul

Inventor
William P. Shattuck
By his Attorneys
Paul & Hawley

No. 647,238. Patented Apr. 10, 1900.
W. P. SHATTUCK.
COMPUTING AND LISTING MACHINE.
(Application filed Sept. 8, 1899.)
(No Model.) 14 Sheets—Sheet 3.

Witnesses
C. F. Kilgore
Richard Paul

Inventor
William P. Shattuck
By his Attorneys
Paul & Hawley

No. 647,238. Patented Apr. 10, 1900.
W. P. SHATTUCK.
COMPUTING AND LISTING MACHINE.
(Application filed Sept. 8, 1899.)
(No Model.) 14 Sheets—Sheet 5.

Witnesses
C. F. Kilgore
Richard Paul

Inventor
William P. Shattuck
By his Attorneys
Paul & Hawley

No. 647,238. Patented Apr. 10, 1900.
W. P. SHATTUCK.
COMPUTING AND LISTING MACHINE.
(Application filed Sept. 8, 1899.)

(No Model.) 14 Sheets—Sheet 6.

Witnesses
C. F. Kilgore
Richard Paul

Inventor
William P. Shattuck
By his Attorney:
Paul O'Hauls

No. 647,238. Patented Apr. 10, 1900.
W. P. SHATTUCK.
COMPUTING AND LISTING MACHINE.
(Application filed Sept. 8, 1899.)

(No Model.) 14 Sheets—Sheet 7.

Witnesses
C. F. Kilgore
Richard Paul

Inventor
William P. Shattuck
By his Attorneys
Paul & Hanley

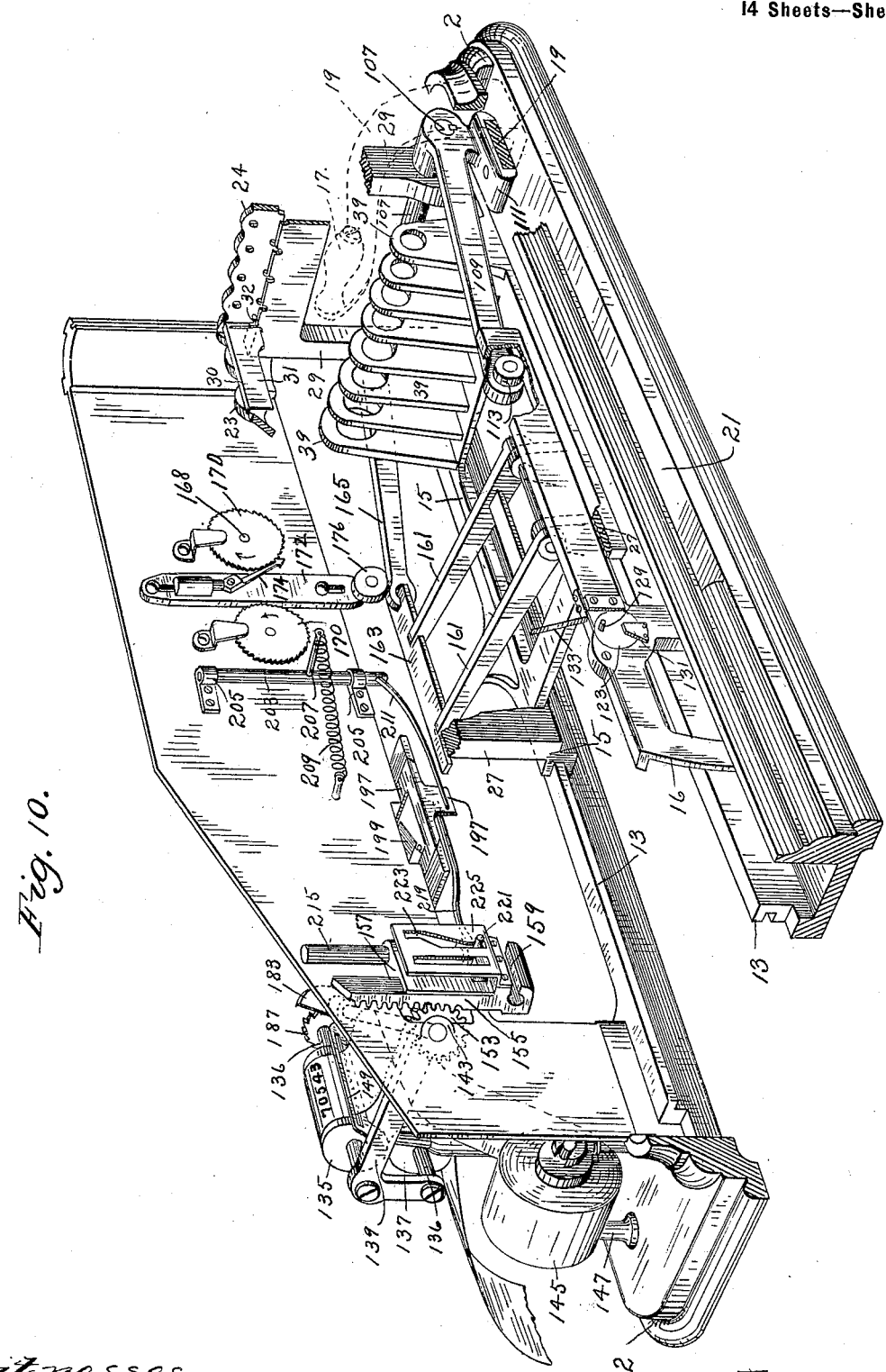

No. 647,238. Patented Apr. 10, 1900.
W. P. SHATTUCK.
COMPUTING AND LISTING MACHINE.
(Application filed Sept. 8, 1899.)
(No Model.) 14 Sheets—Sheet 9.
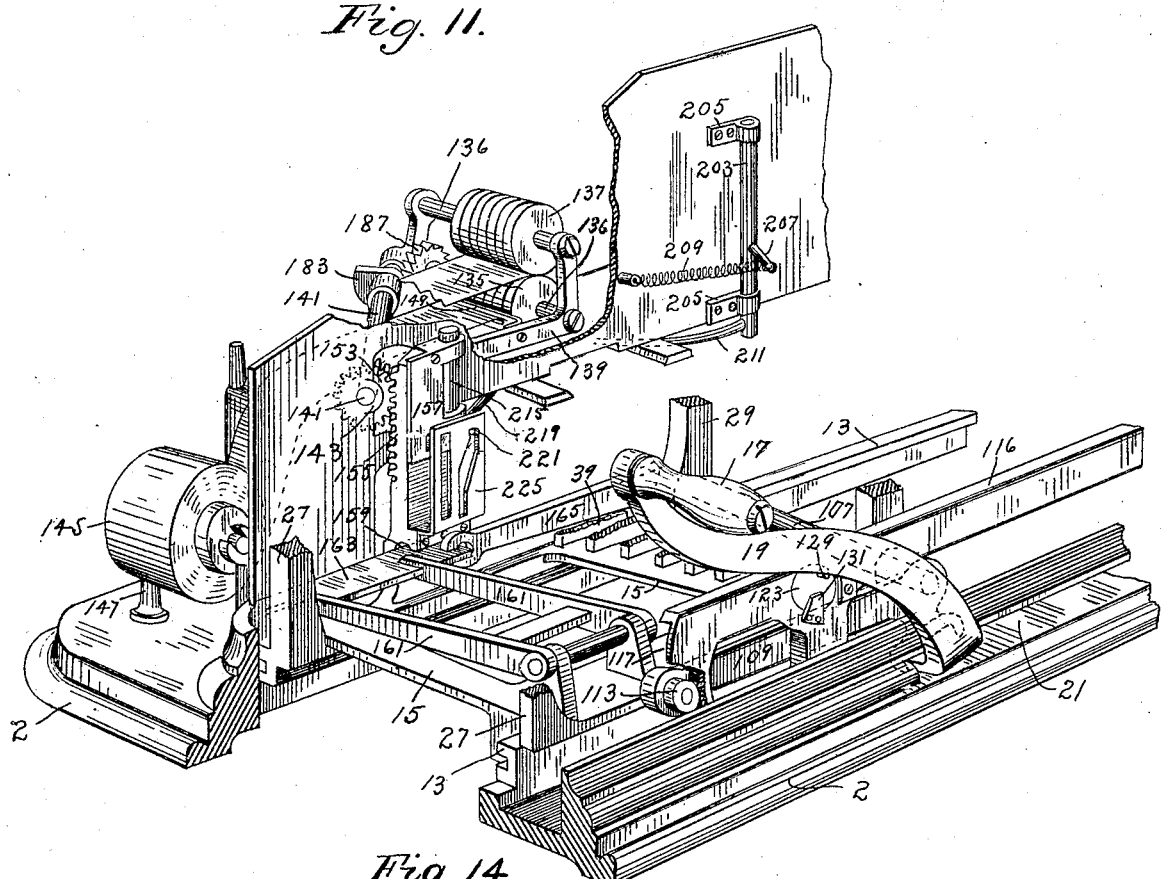

No. 647,238. Patented Apr. 10, 1900.
W. P. SHATTUCK.
COMPUTING AND LISTING MACHINE.
(Application filed Sept. 8, 1899.)
(No Model.) 14 Sheets—Sheet 10.
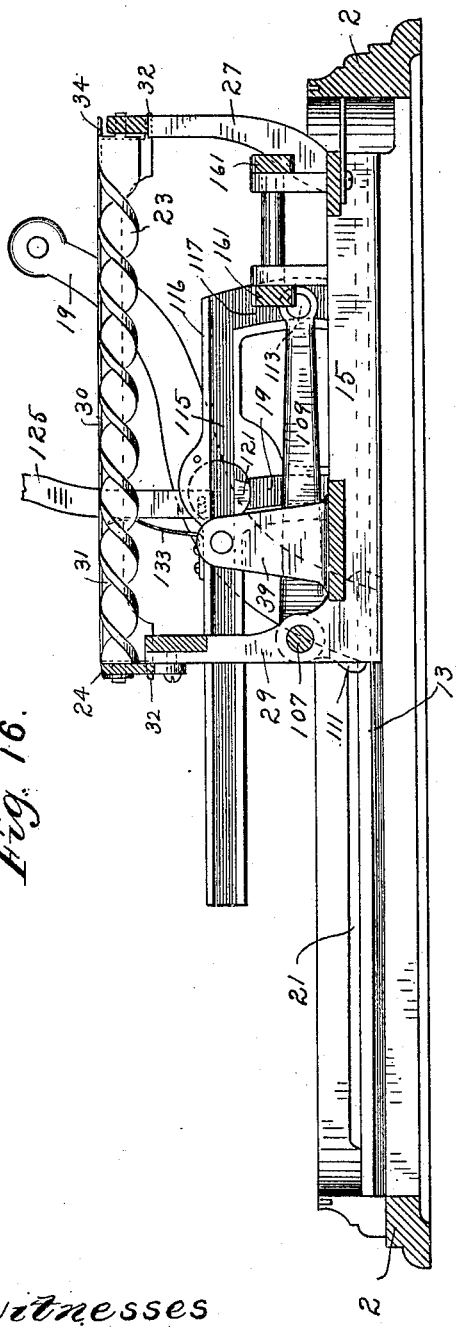
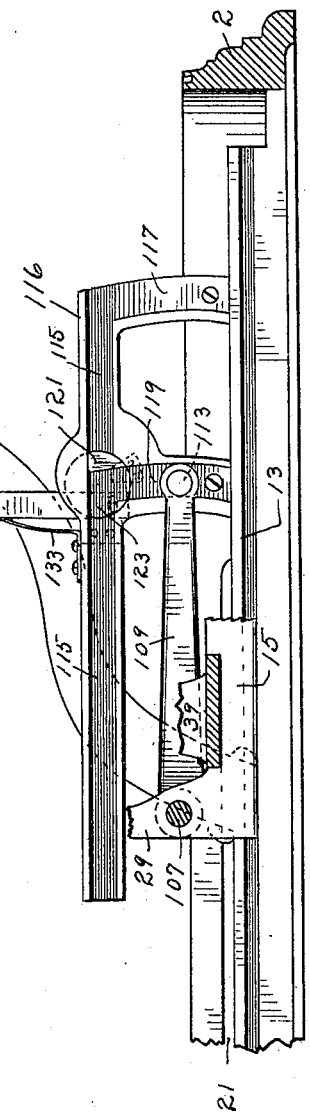

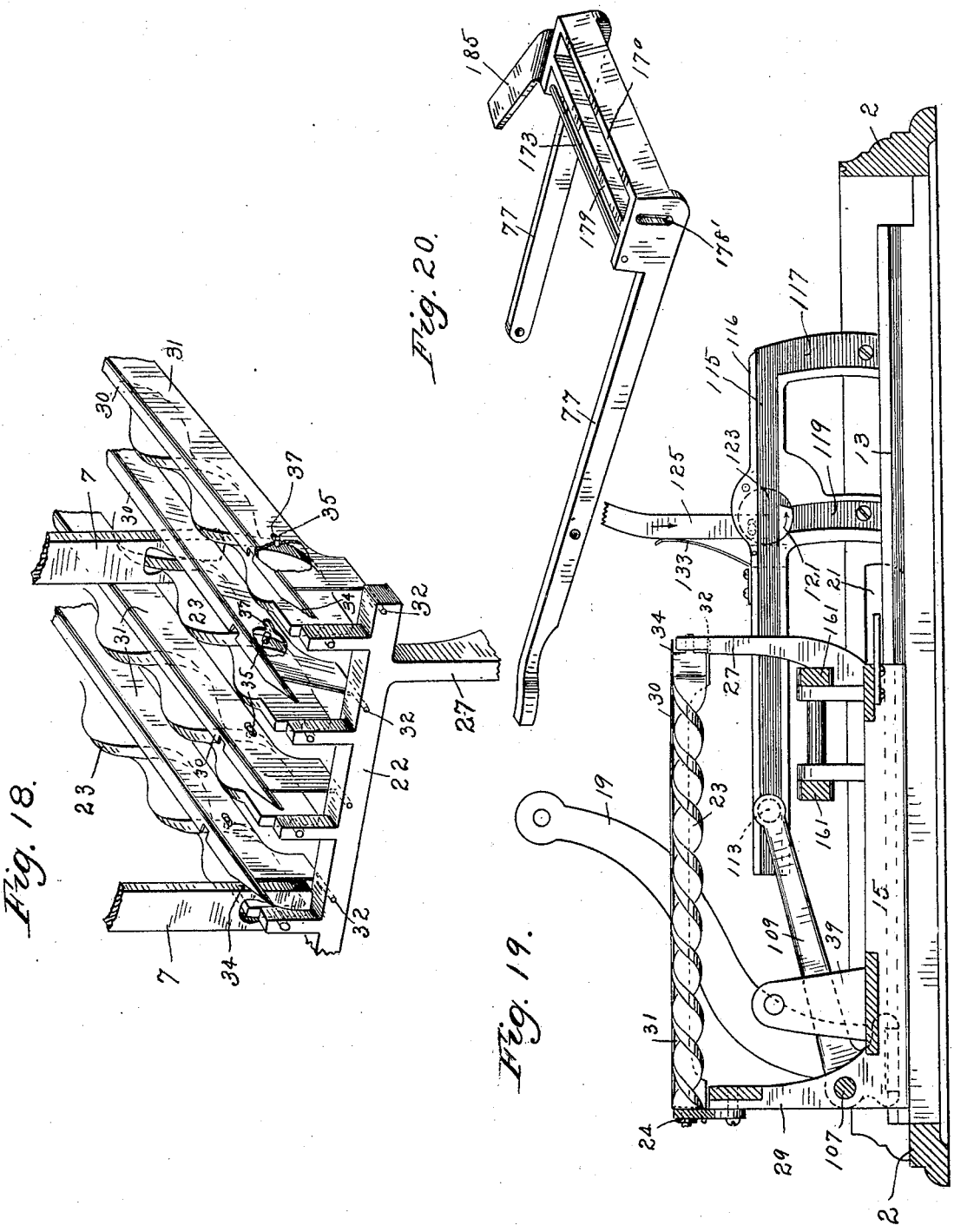

No. 647,238. Patented Apr. 10, 1900.
W. P. SHATTUCK.
COMPUTING AND LISTING MACHINE.
(Application filed Sept. 8, 1899.)
(No Model.) 14 Sheets—Sheet 12.
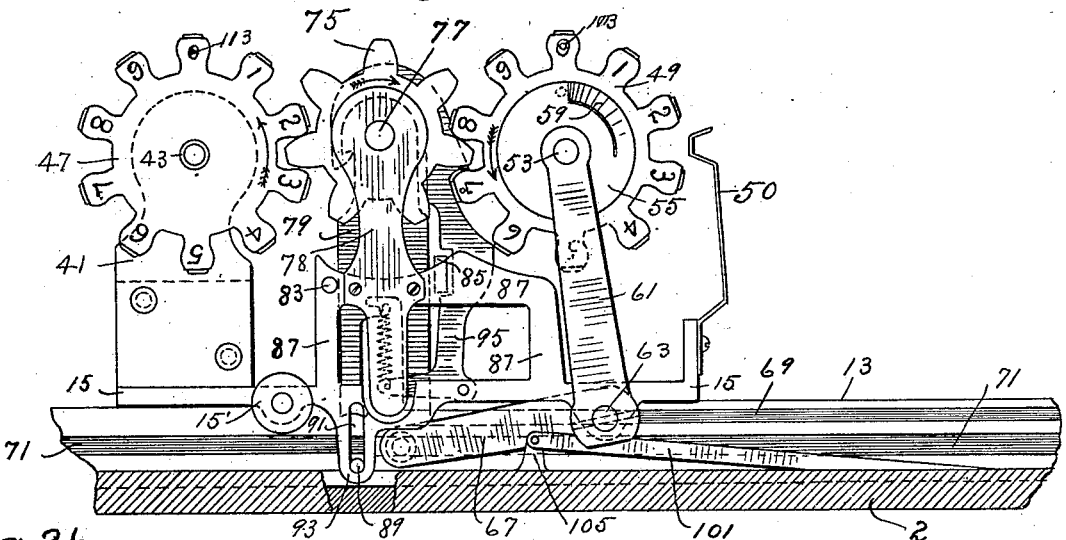
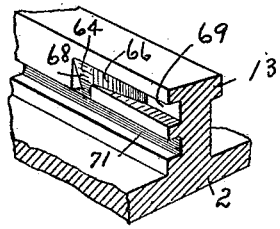
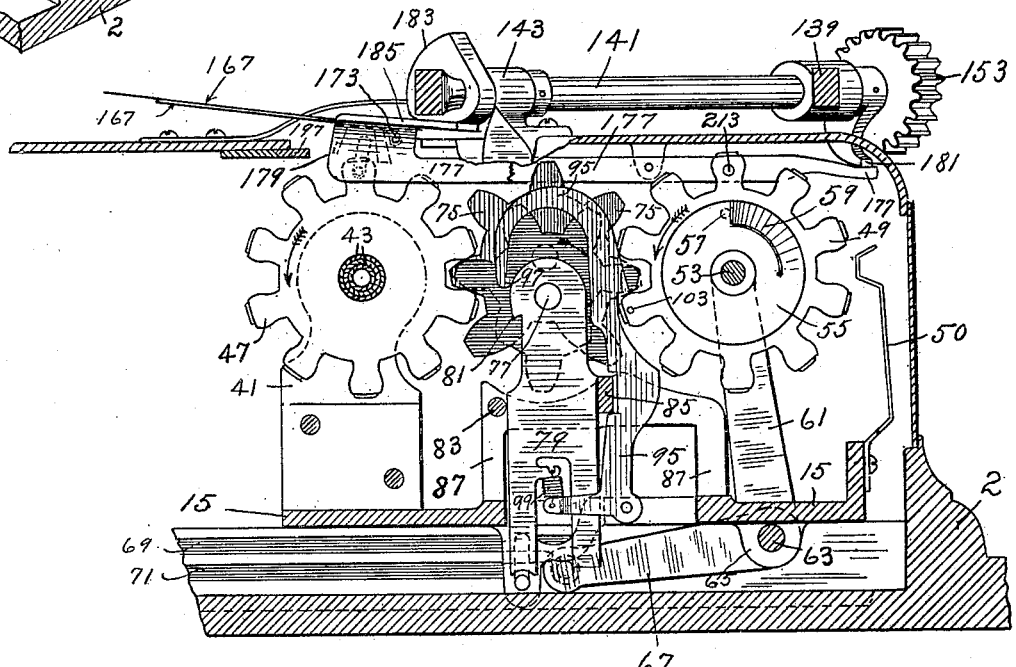
Witnesses
C. F. Kilgore
Richard Paul
Inventor
William P. Shattuck
By his Attorneys
Paul & Hawley No. 647,238. Patented Apr. 10, 1900.
W. P. SHATTUCK.
COMPUTING AND LISTING MACHINE.
(Application filed Sept. 8, 1899.)
(No Model.) 14 Sheets—Sheet 13.
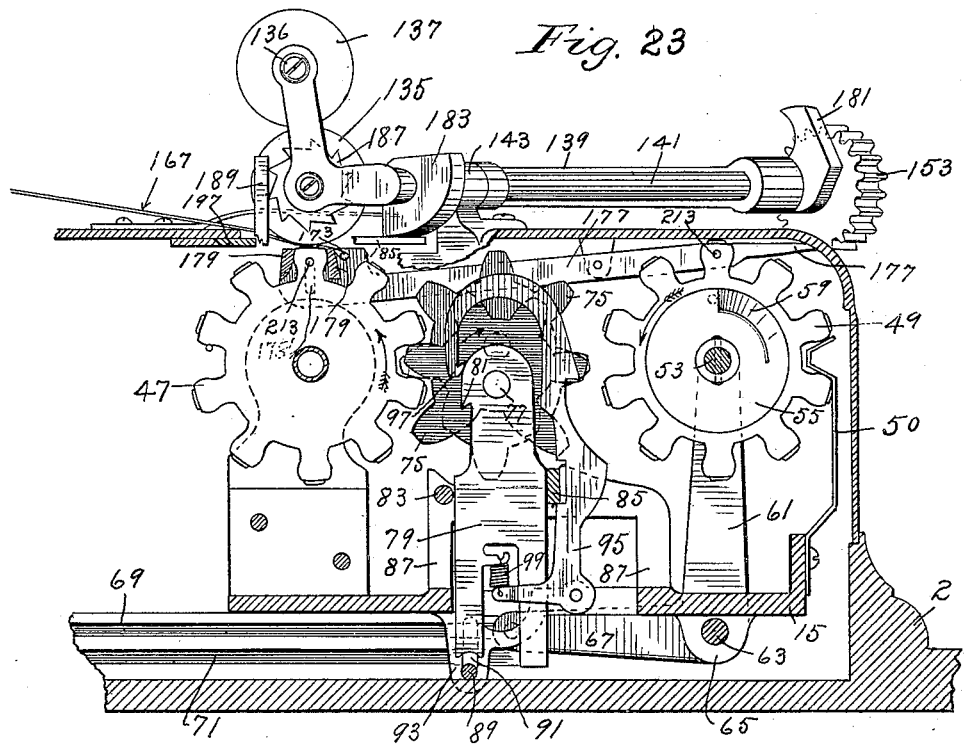
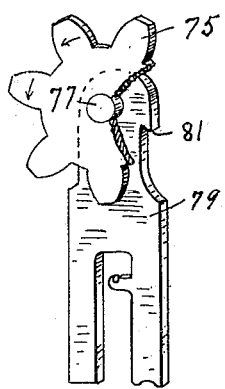
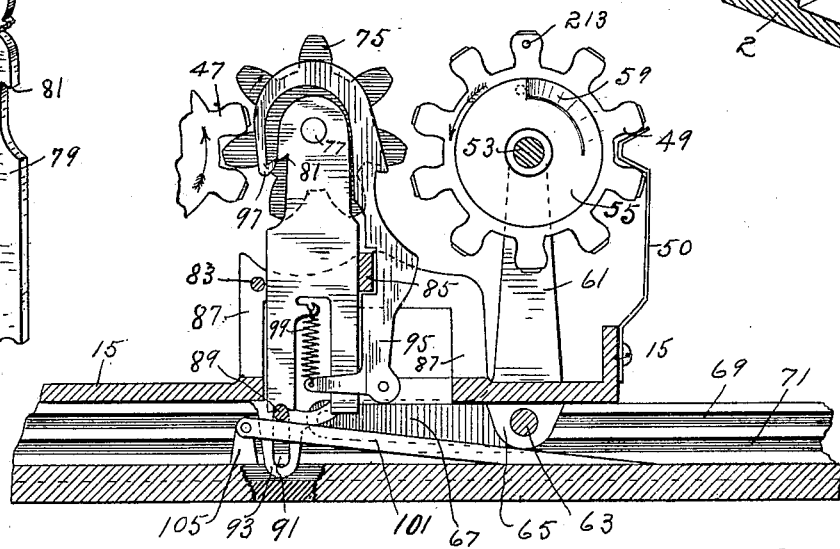
Witnesses
C. F. Kilgore
Richard Paul
Inventor
William P. Shattuck
By his Attorneys
Paul & Hawley
THE NORRIS PETERS CO., PHOTO-LITHO., WASHINGTON, D. C.

No. 647,238. Patented Apr. 10, 1900.
W. P. SHATTUCK.
COMPUTING AND LISTING MACHINE.
(Application filed Sept. 8, 1899.)
(No Model.) 14 Sheets—Sheet 14.
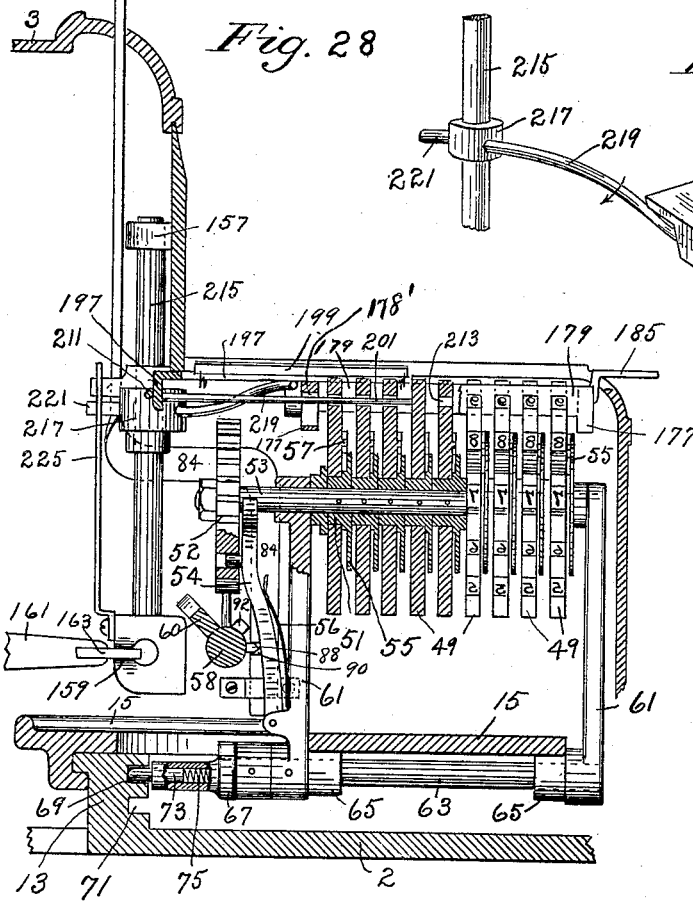
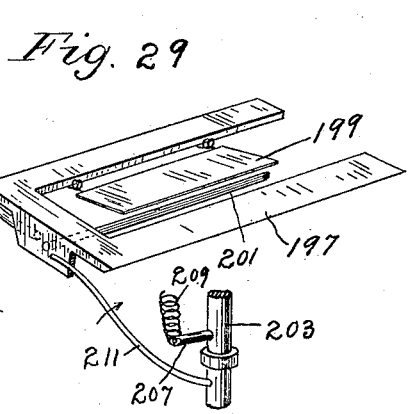
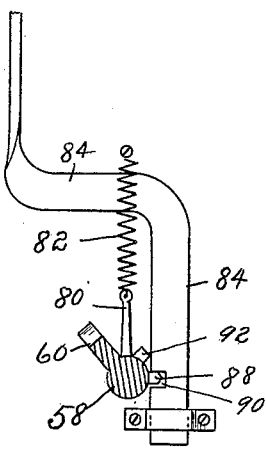
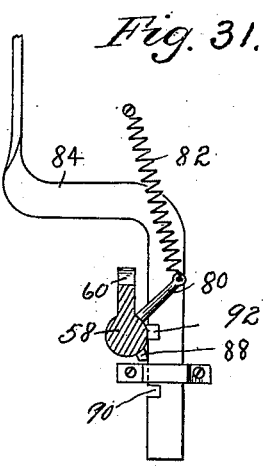
Witnesses
C. F. Kilgore
Richard Paul
Inventor
William P. Shattuck
By his Attorneys
Paul & Hawley

UNITED STATES PATENT OFFICE.

WILLIAM P. SHATTUCK, OF MINNEAPOLIS, MINNESOTA.

COMPUTING AND LISTING MACHINE.

SPECIFICATION forming part of Letters Patent No. 647,238, dated April 10, 1900.

Application filed September 8, 1899. Serial No. 729,830. (No model.)

*To all whom it may concern:*

Be it known that I, WILLIAM P. SHATTUCK, of Minneapolis, Hennepin county, Minnesota, have invented certain new and useful Improvements in Computing and Listing Machines, of which the following is a specification.

This invention relates to improvements in machines for making computations and for printing the results of such computations upon suitable recording-strips.

The machine, as herein shown, is designed especially for use in banks for printing a list of the checks drawn by each customer, adding the amounts of said checks together, and printing the total amount of such checks.

The invention consists generally in a listing and computing machine provided with a suitable keyboard and computing mechanism, the keys of said keyboard being adapted to be set in positions for operating said computing mechanism, and said keyboard and said computing mechanism being capable of relative movement one past the other for the purpose of causing the moved or operated keys to engage with and operate said computing mechanism.

The invention consists, further, in novel means for transferring the movements of the primary or listing wheels to the total-result wheels.

The invention consists, further, in novel constructions and combinations hereinafter described, and particularly pointed out in the claims.

Figure 2:
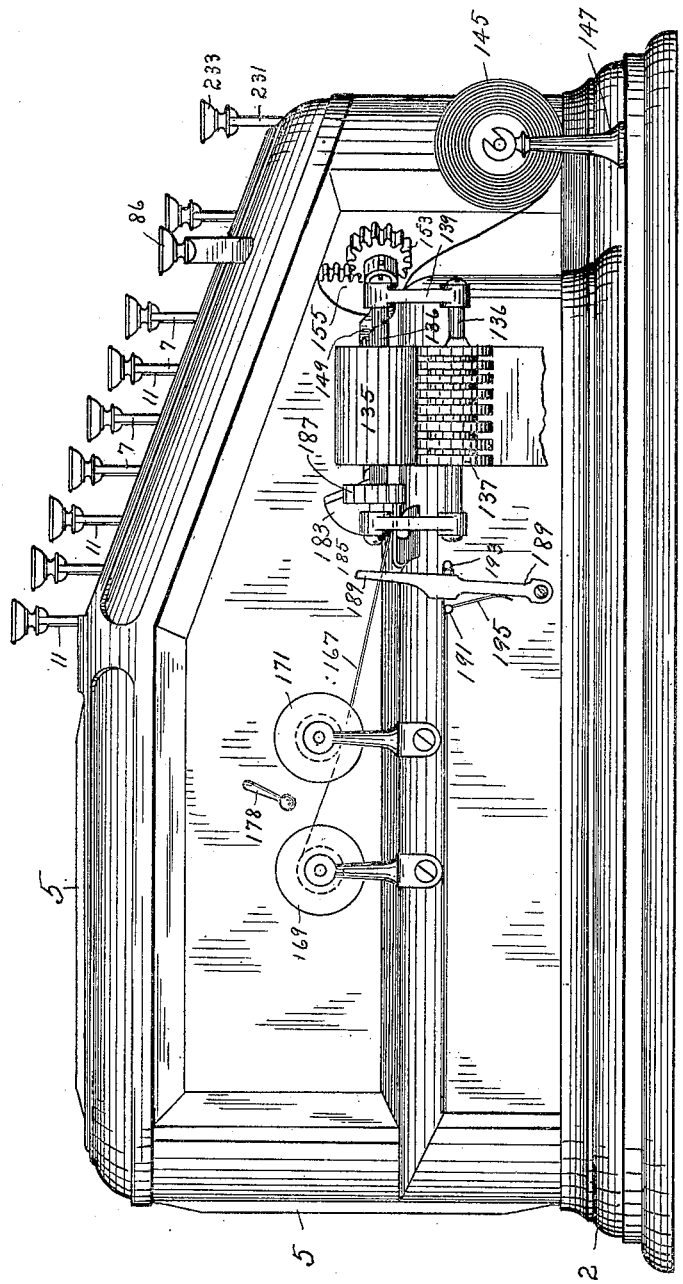
Figure 3:
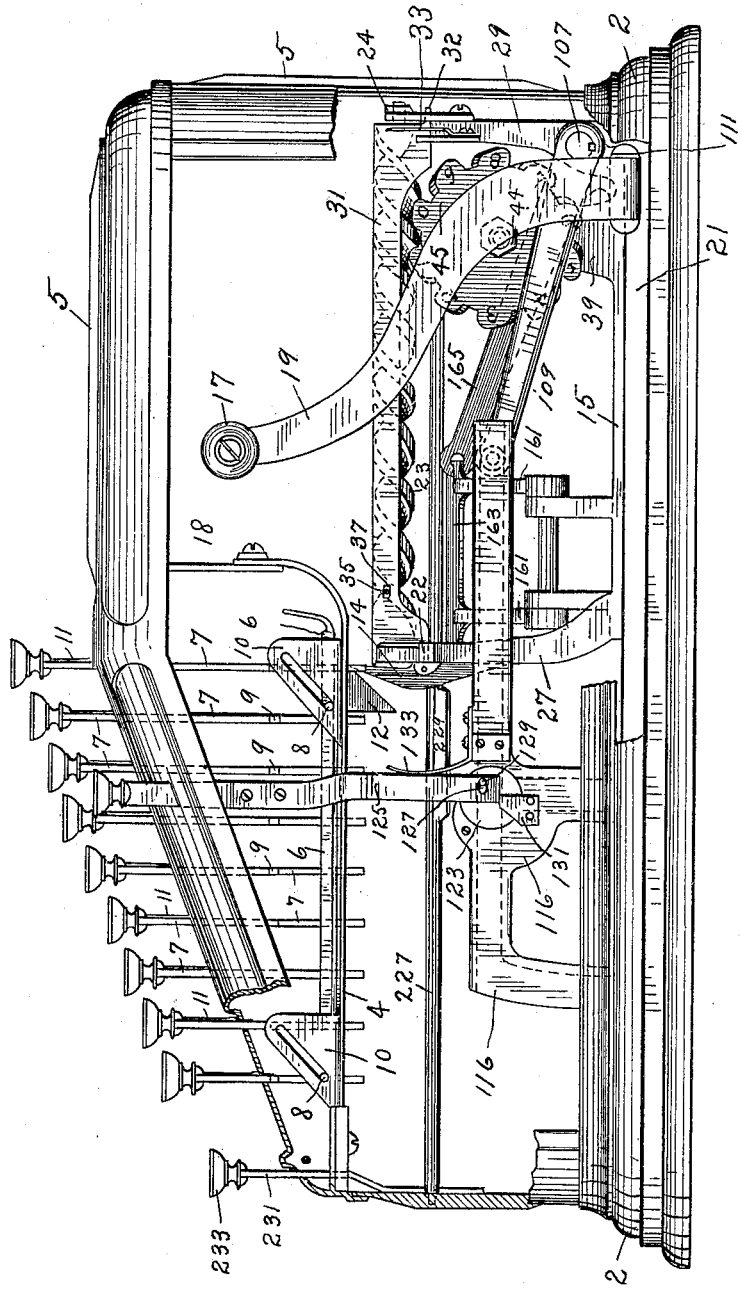
Figure 4:
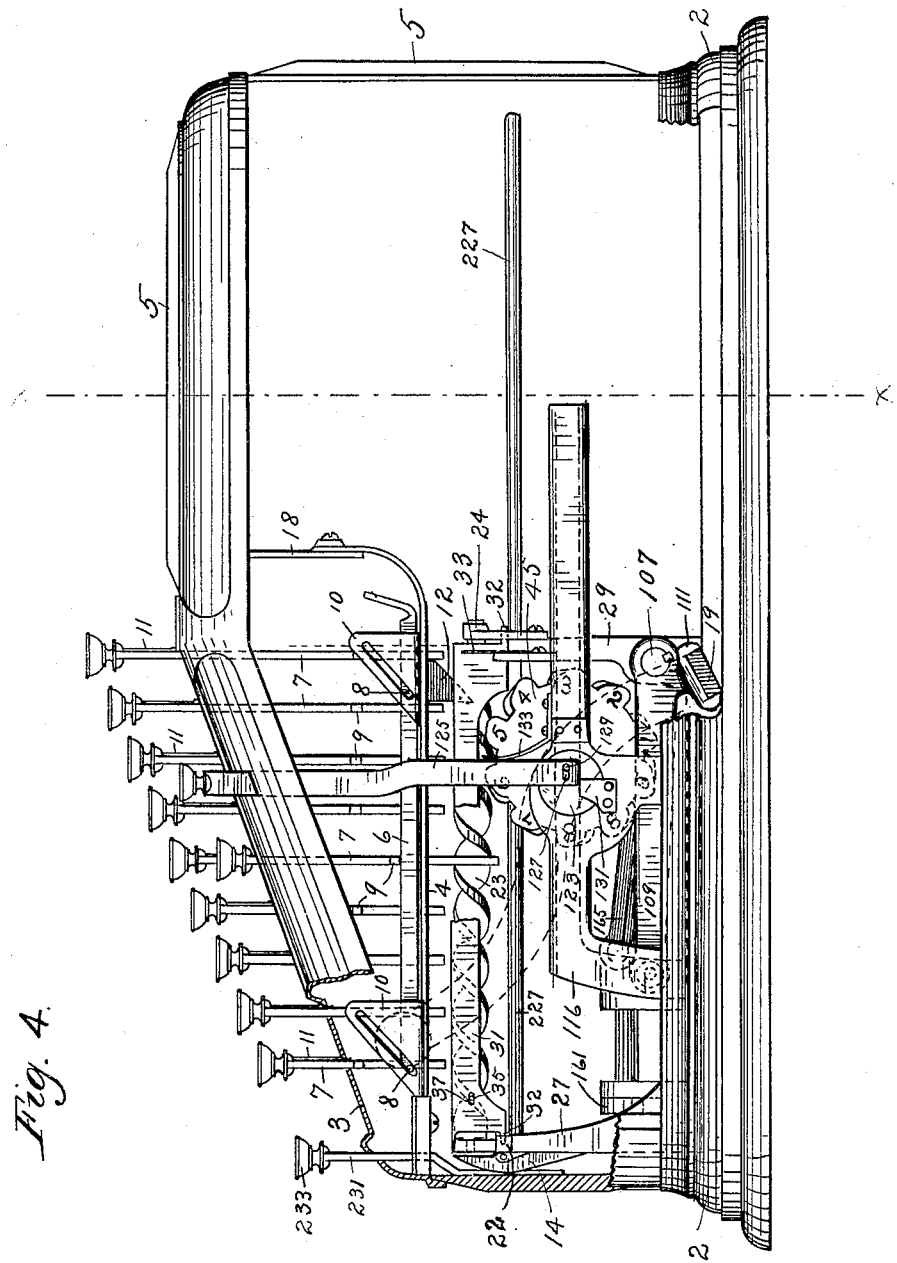
Figure 5:
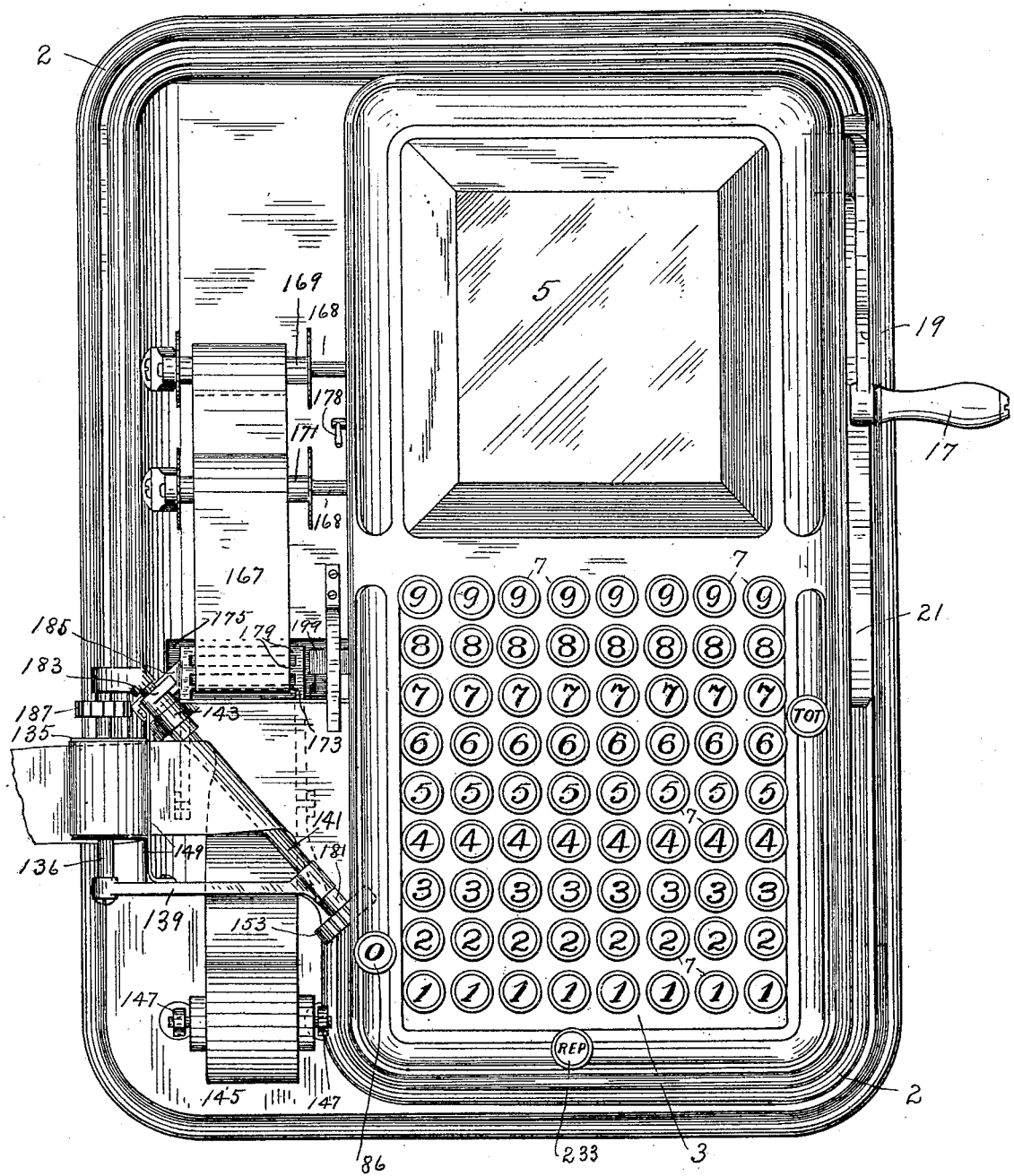
Figure 6:
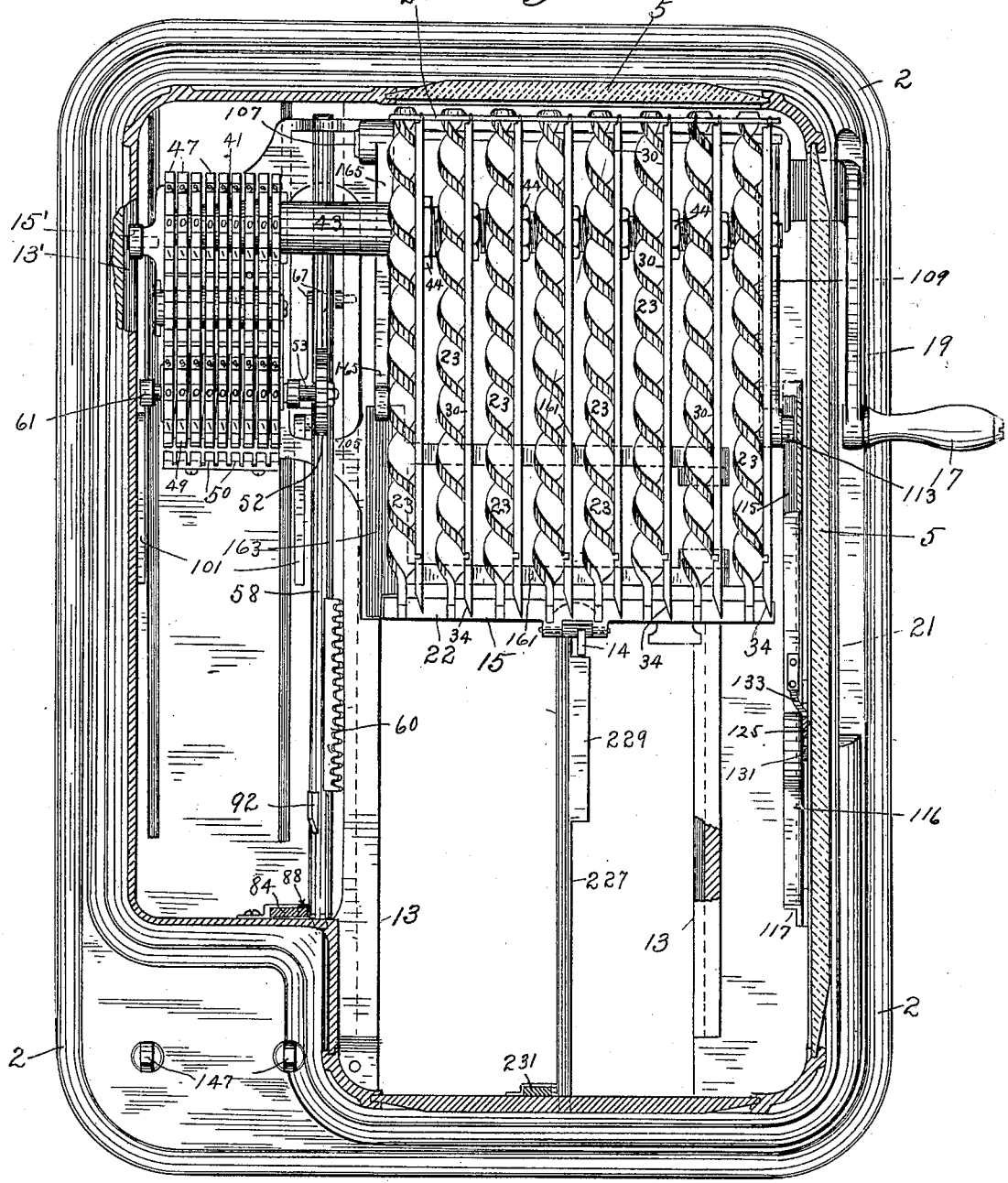
Figure 7:
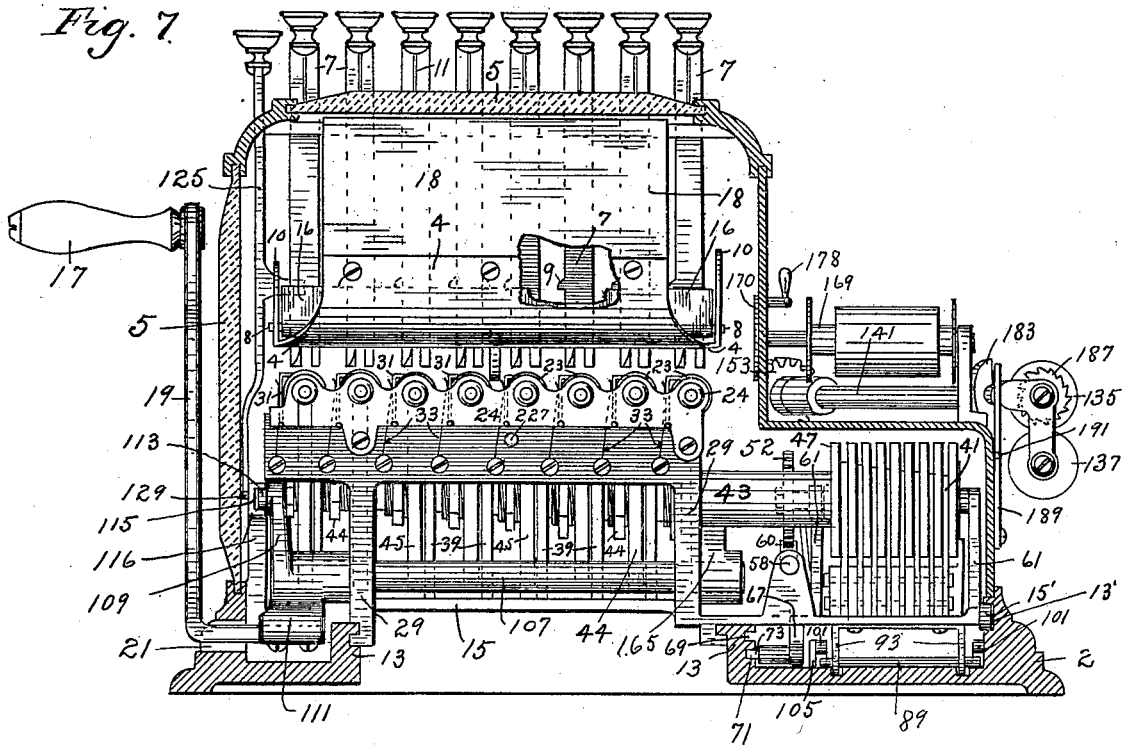
Figure 8:
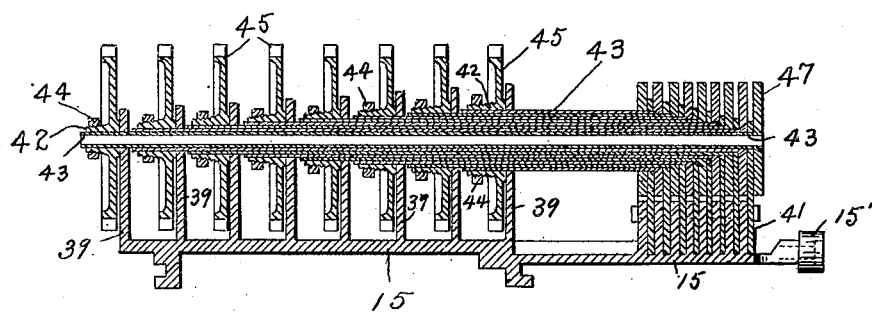
Figure 9:
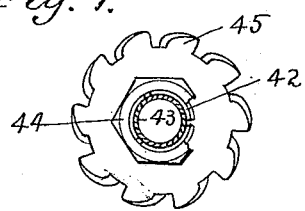

In the accompanying drawings, forming part of this specification, Figure 1 is a perspective view of a listing and computing machine embodying my invention. Fig. 2 is a side elevation. Fig. 3 is a view looking at the opposite side of the machine from that shown in Fig. 2, a portion of the casing being removed or broken away to show the interior of the machine and the movable carriage being at the limit of its reverse or backward movement. Fig. 4 is a view similar to Fig. 3, but showing the carriage at the limit of its forward movement. Fig. 5 is a plan view of the machine. Fig. 6 is a horizontal section of the machine, taken on a line just above the spiral shafts. Fig. 7 is a transverse section of the machine, taken on the line $x\,x$ of Fig. 4. Fig. 8 is a section through the listing type-wheels, their supporting-shafts and bearings and the operating-wheels. Fig. 9 is a detail of one of the worm-wheels. Fig. 10 is a perspective view showing portions of the interior of the machine, the carriage being at the limit of its backward or reverse movement. Fig. 11 is a perspective view of portions of the interior of the machine, showing the carriage at the limit of its forward movement. Figs. 12 and 13 are details illustrating the operation of the repeat device. Figs. 14 and 15 are details of the key-restoring device. Fig. 16 is a detail and partial side elevation illustrating a portion of the means for printing the amounts from the type-wheels. Fig. 17 is a side elevation and partial section illustrating the operation of printing from the total-result wheels. Fig. 18 is a perspective view of a number of the spiral shafts and their locking devices and showing the position of two of the depressed or operated keys. Fig. 19 is a side elevation of the movable carriage and a partial side elevation and section of portions of the casing. Fig. 20 is a detail of the alining device. Fig. 21 is a side elevation of the type-wheels. Fig. 22 is a view similar to Fig. 21, illustrating the means for carrying from one of the total-result wheels to the next and showing also the alining device. Fig. 23 is a view similar to Fig. 22, with the total-result wheels separated from or out of engagement with the transfer-wheels and showing also a different position of the alining device. Fig. 24 is a partial end elevation of the recording-wheels and transfer device. Fig. 25 is a detail of the transfer-wheel and support. Figs. 26 and 27 are details illustrating the means for moving the total-result wheels into or out of engagement with the transfer-wheels. Fig. 28 is a detail section of the means for returning all of the total-result wheels to zero and also illustrating the means for preventing the printing of zeros from those wheels beyond the highest number to be printed. Fig. 29 is a perspective detail showing the means employed for covering the wheels that are not to print. Figs. 30 and 31 are details of the device for restoring the total-result wheels to zero.

*The casing.*—In the drawings, 2 represents the case of the machine, which may be of any suitable or preferred form or construction. I have shown in the drawings a metallic case having a broad substantially-flat base and a box-like inclosure having the forward portion of its top wall inclined. This inclined portion 3 of the top wall forms the support and guide or keyboard for the keys hereinafter referred to. As here shown, the case is also provided with the glass panels 5. These of course may be omitted, if preferred.

*The keys.*—Mounted in the inclined wall 3 of the case are the vertically-movable keys 7, each consisting, preferably, of a flat bar divided or forked at its lower end and provided also near its lower end with a shoulder 9. These keys are provided at their upper ends with the usual buttons or tops provided with suitable figures or characters. The bars 7 are of increasing length from the front to the back of the keyboard, so that the lower ends of the keys are in substantially the same plane, and the shoulders 9 are in substantially the same plane. The keys 7 are arranged in rows running from the front to the back of the keyboard and numbered consecutively, as shown in Figs. 1 and 5. I have here shown eight rows of keys, which permit me to register and print numbers up to "99,999,999" or when recording amounts representing United States or Canadian money nine hundred and ninety-nine thousand nine hundred and ninety-nine dollars and ninety-nine cents. I do not, however, limit myself to any particular number of rows of keys. Each key is provided with a suitable spring 11, preferably having its upper end secured to the key and its lower end free and provided with a projection or raised portion, which holds the key in its elevated position by engagement with the wall of the slot or opening through which the key passes. The keys are by these springs all held normally in an elevated position. When any key is depressed, its spring 11 is compressed, and the key passes to its lower position, as illustrated by the position of one of the keys in Fig. 4 and by the position of one of the keys in Fig. 12.

*The movable carriage.*—The casing of the machine is provided in the base portion thereof with suitable guide-rails 13 and a guideway 13', which extend longitudinally of the machine and preferably nearly its full length. Mounted upon these guide-rails and adapted to slide back and forth thereon is a suitable carriage 15, having preferably, also, the roll 15', that moves in the guideway 13', Fig. 7. This carriage is adapted to be reciprocated in the casing by means of a suitable handle 17, arranged upon a crank-arm 19, that extends through a slot 21 near the bottom of the casing. The carriage 15 has mounted upon it the type-wheels, their supports, and means for operating said wheels, as hereinafter described. In Fig. 3 of the drawings the carriage is shown at the rear end of the casing or in the position that it occupies while the keys are being depressed. In Fig. 4 of the drawings the carriage is shown at the limit of its forward movement, with one of the keys depressed and in position for engagement with the type-wheel-operating mechanism.

*The spiral shafts.*—Mounted in bearings 22 and 24 are the spirally-grooved shafts 23. These shafts extend longitudinally of the machine or in the direction of the movement of the carriage, and there are as many of these spiral shafts as there are rows of keys on the machine. As here shown, the ends of the shafts are provided with journals which are mounted in the bearings or bars 22 and 24, so as to permit the spiral shafts to turn freely in either direction. The bars 22 and 24 are secured upon suitable standards 27 29 on the forward and rear ends of the carriage. These spiral shafts 23 normally remain stationary while the carriage is reciprocated; but when any key of the corresponding row is depressed its forked lower end is brought into position to engage the spiral shaft as the carriage is moved forward, causing the shaft so engaged to be rotated, and the amount of rotation given to such shaft depends upon the position of the key which engages said shaft. For instance, if a key bearing the figure "9" is depressed it engages the spiral shaft in line therewith almost immediately after the carriage begins its forward movement, and this engagement continues throughout the movement of the carriage, and the spiral shaft is continuously turned until the forward movement of the carriage ceases. If, however, the key bearing the figure "1" in any row is depressed, it does not engage the corresponding spiral shaft until the carriage has nearly reached the limit of its forward movement. Hence the spiral shaft is rotated only during a short portion of the movement of the carriage.

I prefer to provide means for locking each spiral shaft in a stationary position except while it is in engagement with one of the operating-keys. For this purpose I provide in connection with each spiral shaft a locking-plate 31, mounted upon pivots 32 in the bars 22 and 24 that support the spiral shaft. A spring 33 is provided for each plate 31, and these springs hold the plates against the spiral shafts. Each shaft is also provided with a pin 35, that engages a slot 37 in the plate 31, whereby said shaft is locked except when the plate is held away from the shaft. The operation of this part of the mechanism is clearly illustrated in Fig. 18 of the drawings. Each of the plates 31 is provided at its upper edge with a substantially-horizontal flange 30, having a beveled forward end 34. When one of the keys 7 is depressed and the carriage is moved forward, the forked end of the key straddles the upwardly-projecting portion of the bar 22, forming the bearing for the corresponding spiral shaft 23, and in the further movement of the carriage straddles the spiral shaft. The initial portion of the shaft is made flat, as shown in Fig. 18, and the engagement of the flange of the plate 31 with the outer surface of the keys turns the upper edge of the plate 31 outward away from the spiral shaft, freeing the pin 35 from the slot 37 before the shaft begins to rotate. The key remains in its depressed position and rotates the spiral shaft during the remaining portion of the forward movement of the carriage and then rotates the shaft in the reverse direction during the reverse movement of the carriage until the end of the shaft passes out of the fork of the key. As soon as this is done the plate 31 is forced by its spring back against the surface of the spiral shaft, and the slot in the plate, engaging the pin on the shaft, locks the shaft and prevents further movement thereof until the plate is again turned away from the shaft by its engagement with one of the keys.

*The listing type-wheels and tubular supporting-shafts.*—Mounted in bearings 39 and 41 on the carriage 15 are the series of tubular shafts 43, arranged one within another, and each provided upon one end with a worm-wheel 45, that is engaged by one of the spiral shafts 23, and upon the other end with a type-wheel 47. These type-wheels I term the "primary" or "listing" type-wheels. These type-wheels may also be termed the "temporary" or "indicating" wheels, as each amount that is to be listed is temporarily indicated or shown on these wheels and is then transferred to the total-result wheels. The wheels 45 may be secured by any suitable means upon the tubular shafts. I have here shown each wheel provided with a threaded split hub 42 and with a clamping-collar 44, screwed upon this hub and clamping the hub upon the shaft. (See Figs. 8 and 9.) I do not, however, limit myself to any particular means for securing the wheels to the shafts. Each of the tubular shafts, it will be seen, is mounted in an independent bearing at each end, so that any one of the shafts may turn independently of all the others. Each tubular shaft and type-wheel carried by it rotates at all times with the corresponding spiral shaft 23. Each of the type-wheels is provided upon its circumference with a series of type-figures from "1" to "0," and when in normal position, with the spiral shafts locked against rotation, the type-wheels all stand with the zero-types in line with one another and in printing position. As each spiral shaft is rotated by engagement with one of the keys in the corresponding row the type-wheel upon the corresponding tubular shaft is correspondingly rotated, so as to bring the figure corresponding to that on the depressed key into printing position. When the carriage is reversed, the type-wheels are turned back to zero. If when the carriage is moved forward there are any rows of keys in which no key has been depressed, the spiral shaft in line with that row of keys will remain stationary and zero will be printed by the corresponding type-wheel.

It will be understood that by means of the keys, the spiral shafts, the connected tubular shafts, and the type-wheels carried thereby any desired numbers may be brought into position by turning of the type-wheels to be printed by the means hereinafter described, and that the type-wheels are restored to zero after the printing of each number or amount. By this means, therefore, where the machine is used for making lists of bank-checks the amounts of the separate checks may be printed.

*The total-result type-wheels.*—It is necessary, in addition, to provide means for adding the several numbers thus printed and printing the total or result of such addition whenever desired. This means I will now proceed to describe, stating first, however, that one of the most important features of my invention consists in the novel and exceedingly simple means that I provide for recording the total result of any number of operations of the machine upon the total-result wheels which may at any time be printed upon the recording-strip, thereby showing the sum of all of the numbers previously printed on the slip. The wheels 49 (which for convenience I call the "total-result" wheels) are type-wheels similar to the type-wheels 47; but they are mounted loosely upon collars 51 on the shaft 53. The collars 51 are secured upon the shaft 53, so as to turn therewith, and each collar has a disk 55, preferably formed integrally therewith and projecting between two of the type-wheels 49. Each type-wheel 49 has a pin 57 projecting laterally therefrom toward the disk 55, and each disk has a spring-dog 59 (see Fig. 22) secured to or formed on it, which dog is adapted to engage the pin 57 on the wheel 49. This dog does not prevent the free turning of the wheel in one direction; but if the shaft 53 is turned in one direction each of the dogs 59 will at some point in the revolution of the shaft come in contact with the pin 57 on the corresponding wheel 49, and said wheel will thereafter turn with said shaft. This means is employed for turning all of the wheels 49 back to zero when it is desired to begin a new set of indications and a new computation and new record. The shaft 53 is mounted in standards 61, which are secured upon a rock-shaft 63, mounted in suitable bearings 65, forming part of the carriage 15. A bell-crank arm 67 is secured to the shaft 63. (See Figs. 21, 22, 23, and 24.) Two parallel slots or guideways 69 71 are formed in the base of the machine, and the crank-arm 67 is provided with a spring-pin 73, adapted to engage either one of the slots 69 or 71. This pin is mounted in a hole in the crank-arm, and a spring 75, arranged in the rear of the pin, tends to project said pin into one of said slots. The slots 69 and 71 are connected at their ends by the cross-slots 68 and 70. (See Figs. 26 and 27.) At one end the slot 71 is provided with the incline 72 and the cross-slot 70 with the incline 74, and at the other end the slot 69 is provided with the incline 66 and the cross-slot 68 is provided with the incline 64. These inclines are on the inner walls of the slots. The spring-pin 73 normally projects into one of the slots 69 or 71. When it is in the slot 69, the total-result wheels 49 stand in the position shown in Figs. 23 and 24. When the pin 73 is in the slot 69, the total-result wheels 49 stand in the position shown in Figs. 21 and 22 and are then in engagement with the transfer-wheels hereinafter described. The slot or guideway 71 extends to the end of the base to permit the pin to travel therein in putting the carriage into or removing it from the casing. When the carriage 15 is moved forward and the type-wheels 47 are turned to various positions by the moved keys, the pin 73 moves in the slot or guideway 71 and the wheels 49 are, through the transfer-wheels hereinafter described, turned in unison with the wheels 47. When the carriage reaches the limit of its forward movement, the pin 73 has arrived at the end of the slot or guideway 71, has passed over the incline 72 at the end of the guideway 71, and onto the incline 74 in the cross-slot 70. The pressure of the spring 75 on the pin forces the pin to travel down the incline 74, thereby bringing said pin into the end of the cross-slot 70 or the beginning of the slot or guideway 69. This movement will turn the crank-arm 67 from the position shown in Figs. 21 and 22 to the position shown in Fig. 23 and will carry the total-result wheels 49 out of engagement with the transfer-wheels and into engagement with a spring locking-dog 50. It will thus be seen that during the forward movement of the carriage while the listing type-wheels 47 are being turned into position to print upon the recording-slip the amounts indicated by the keys that have been depressed the total-result wheels 49 will move in unison with said type-wheels 47, but that during the backward movement of the carriage when the wheels 47 are turned back to zero the total-result wheels are out of engagement with the type-wheels 47 and do not partake of this reverse or backward movement. Hence the wheels 49 constitute adding or total-result wheels and indicate at any time the total result of any desired number of operations of the machine.

*The transfer-wheels and carrying device.*—As the type-wheels 47 simply indicate single transactions or single entries made by the machine no carrying device is needed in connection therewith, but the total-result wheels must be provided with a carrying device which will cause each wheel in the series to be turned one step each time that the preceding wheel makes a complete revolution. This result is effected by the peculiar manner in which I mount and operate the intermediate or transfer wheels.

The transfer-wheels 75 are arranged in engagement with the type-wheels 47, and there are as many of these intermediate or transfer wheels as there are of the type-wheels 47. Each of the wheels 75 is mounted on a short stub or shaft 77 in a vertically-sliding standard 79. (See Fig. 25.) Each of said standards is provided with a notch or recess 81 and is arranged to slide vertically between the transverse rod 83, the transverse bar 85, and frames 87. Said rod 83 and said bar 85 are mounted in the vertically-projecting frames 87, which form a part of the sliding carriage. The lower ends of the vertically-sliding standards 79 are preferably forked, (see Figs. 22, 23, and 24,) and one end of one portion of the fork comes above a transverse rod 89, arranged in slots 91 in depending lugs 93. A pivoted bell-crank lever 95 is arranged in connection with each of the vertically-moving standards 79. (See Figs. 23 and 24.) These levers extend over the tops of the standards 79, and each lever is provided with a hook 97, adapted to engage the notch 81 in the standard. A spring 99 is connected to the short arm of each lever and to the standard, as shown in Figs. 21, 22, 23, and 24. As the carriage is moved forward the rod 89 rides over the inclined bars 101. One of said bars 101 is arranged at each end of the rod 89. (See Fig. 7.) As the rod 89 rides over the inclined bars 101 it raises all of the standards 79 that may be in the lower position shown in Fig. 23 to the position shown in Fig. 21, when the hook 97 on the bell-crank lever 95 engages the notch 81 in each standard 79 and holds said standard in its elevated position. The transfer-wheels 75 are then in the position shown in Fig. 21, and when the total-result wheels are engaged with the transfer-wheels the motion of the type-wheels 47 is transmitted through the transfer-wheels to the total-result wheels. If any one of the wheels 47 remains idle during the forward movement of the carriage by reason of the keys controlling said wheel not being depressed, the corresponding transfer-wheel 75 and total-result wheel 49 will also remain idle, except as hereinafter stated. Each of the wheels 49 is provided at the proper point on its side with a pin 103. (See Figs. 21 and 22.) This pin is in such position that when the nine-type passes the printing-point this pin comes into engagement with the lever 95 of the next succeeding transfer-wheel or the transfer-wheel intermeshing with the next succeeding total-result wheel of a higher denomination. The engagement of this pin with the lever 95 disengages the hook 97 from the notch 81, and the standard 79 is depressed or drawn downward by the spring 99 and the transfer-wheel carried by said standard is moved from the upper position (shown in Figs. 22 and 23) to the lower position. (Shown in the same figures.) As, however, one tooth of this wheel is in mesh at all times with the type-wheel 47, which is either stationary or moving in the direction indicated by the arrow in Figs. 21 and 24, the lowering or downward movement of the transfer-wheel will give to the corresponding total-result wheel a one-step movement. This operation will take place whether the corresponding wheel 47 is moving or not and whether the transfer-wheel is moving or not, and hence whether the corresponding total-result wheel is being rotated by the type-wheel 47 and transfer-wheel 75 or is stationary. When any one of the wheels 77 has been depressed or lowered in the manner described, it remains in this position, and if the corresponding type-wheel is moving continues to turn and transmit such movement to the total-result wheel until the total-result wheel is disengaged therefrom at the beginning of the backward movement of the carriage. During the return or reverse movement of the carriage any of the standards 79 that have been moved down are elevated by the passage of the rod 89 over the inclined bars 101, and by engagement of the hooks 97 on the levers 95 with said standards said standards are locked in an elevated position. The bars 101 are each pivoted at one end to the lugs or projections 105, (see Figs. 7, 21, and 24,) and their opposite ends (which are cut off diagonally on the under side) rest by gravity upon the base of the machine, so that as the carriage is moved backward after each registration and printing operation the rod 89 rides up over the inclined bars 101, as before stated, and raises all of the movable standards 79 that have been released and depressed by the carrying operation of the total-result wheels and causes them to be engaged by the hooks 97 on the bell-crank levers 95, whereby said standards and transfer-wheels are held in this elevated position. Upon the forward movement of the carriage, however, the ends of the rod 89 pass under the raised ends of the bars 101 and lifting the free ends of said bars pass under them also. As the first transfer-wheel in the series never need be moved downward, the first carrying operation being performed by the second transfer-wheel, the first transfer-wheel is mounted on a fixed standard 78, secured upon the first frame 87. (See Fig. 21.) While there are eight rows of keys, I have shown nine total-result wheels. Of course any number of such wheels may be used. The last total-result wheel in the series is not rotated, except that it is moved one step each time the preceding wheel makes a complete revolution, or, in other words, the preceding wheel "carries" to this wheel. To produce this carrying operation, it is necessary to provide a corresponding transfer-wheel and movable standard, and as the opposite tooth of the transfer-wheel must be held when the standard is moved downward, I have shown a ninth type-wheel 47. This wheel, however, does not rotate and need not be provided with type, and instead of being a complete wheel it need only be a portion of a wheel provided with two teeth, with a recess between them to act as a stop for the tooth of the transfer-wheel that projects into this space. Any suitable means may be provided to hold the movable standards 79 in a vertical position and to guide them while they are being moved. As here shown, I have provided a series of the frames 87, one between every two standards, with the transverse rod 83 and transverse bar 85 passing through all of said frames. The lower end of each standard 79 also passes through a slot in the base of the machine, and these devices serve to hold the standards 79 independently in upright positions and to guide said standards as they are moved. It will be seen that only one spring is used both for the pivoted bell-crank lever 95 and for the movable standard 79. This spring is, as before stated, connected to a hook on the standard and to the short arm of the bell-crank lever. When the standard is in its elevated position, as shown in Figs. 21 and 24, the spring is distended and is under tension. As soon as the pin on the total-result wheel strikes the lever 95 and throws the hook 97 out of engagement with the notch 81 this spring draws the standard and the transfer-wheel carried by it downward and gives to the next succeeding total-result wheel from that by which the lever was moved a one-step movement. When the standard 79 is raised by the rod 89 riding over the inclined bars 101, the spring 99, acting on the bell-crank lever 95, throws the hook 97 into position to engage with the notch 81, and thereby to lock the standard in its elevated position.

While I have described the transfer-wheels as being given a downward movement for the purpose of carrying from one total-result wheel to another and have shown means for thus moving this wheel vertically, it will be understood that I do not limit myself to this particular way of moving the transfer-wheel for this purpose. It is only necessary to give to each transfer-wheel during the carrying operation a bodily or what I have termed an "axial" movement—that is to say, the axis of the transfer-wheel is moved down (or it might be moved up) either vertically or in a curved path in the direction of the movement of the intermeshing portion of the total-result wheel and in the opposite direction to the motion of the intermeshing portion of the corresponding temporary or listing wheel.

*The printing device.*—The printing device may be of any suitable or preferred construction. It consists, preferably and generally, of suitable rolls and a spool carrying a strip of paper, a suitably supported and operated inking-ribbon, and means for forcing the paper against the type over the inking-ribbon when it is desired to print any one of the numbers that have been registered on the machine or the total result of any number of such registrations. It will be understood from the foregoing portion of the description that both the primary or listing type-wheels 47 and the total-result wheels 49 are mounted upon the reciprocating carriage 15 and are therefore moved back and forth with said carriage. The carriage may be stopped, therefore, with either set of wheels in printing position. I have shown in the drawings a simple device for printing from either set of wheels. As here shown, the carriage 15 has mounted at its rear end in the standards 29 a suitable rock-shaft 107, and at one end of said shaft there is secured a double crank 109 111. The crank-arm 19, to which the handle 17 is secured, is connected to the short crank 111, and said crank-arm 19, as before stated, passes through the slot 21 in the casing of the machine. The part of the crank-arm 19 that passes through the slot 21 is broad and flat and slides freely in said slot. The crank-arm 109 is of considerable length and carries at its end the roller 113, which projects into the horizontal groove or way 115. Connected with the groove or way 115 are the transverse grooves 117 119, which preferably extend downward from said groove 115. (See Figs. 16, 17, and 19.) The groove 115 may be formed in the wall of the casing; but I prefer to form this groove in an independent part 116, arranged inside of the wall of the casing and suitably supported upon the base of the machine. The short groove 119 is normally closed at the top by a switch 121. (See Fig. 19.) This switch consists of a block having a smooth upper face and secured upon a circular plate 123, that is inserted in the part 116, in which said grooves or guides are located. Arranged at one side of the keyboard is the key 125, that I designate as the "total-result" key. This key consists of a vertically-movable bar provided with suitable means for guiding it and having at its lower end a slot 127, Fig. 4, that engages a pin 129, eccentrically placed on the plate 123. A stop 131 is formed upon or secured to a stationary part on the machine under the lower end of the key 125. A spring 133, bearing against the side of the key, tends to hold the lower end directly over the top of the stop 131. This stop when the key is in this position prevents any depression of the key, and thereby prevents an accidental printing from the total-result wheels. When it is desired to print from the total-result wheel, the key 125 is depressed, being first given a slight backward movement at its lower end against the tension of the spring 133 to free it from the stop 131. The key is then depressed and it rotates the plate 123 and turns the switch-block 121 from the position shown in Figs. 13 and 16 to the position shown in Fig. 17. The switch-block then forms a stop in the groove 115, while leaving the groove 119 open at its upper end. The printing and paper-feed rolls 135 137 are mounted on suitable shafts 136, that are mounted on the arms 139, secured to the diagonally-arranged shaft 141. (See Figs. 5 and 11.) The shaft 141 is mounted in suitable bearings 143 on the casing of the machine. The spool of paper 145 is mounted on suitable standards 147, and the paper passes under the shaft 141 through a slotted guide 149, that is secured at one end to the frame 139 and at its opposite end to the cam-hub 183 on the shaft 141. This guide is parallel with the shafts 136. The paper then passes over the roll 135 (speaking of the roll in the position that it occupies in Fig. 1 of the drawings) and then between the rolls 135 and 137. The shaft 141 carries at one end a pinion 153. (See Figs. 2, 5, 7, 9, 11, 22, and 23.) This pinion is engaged by a vertically-sliding rack-bar 155, which is held in position by a suitable guide 157. The lower end of the rack-bar 155 is provided with an open-ended slot 159. Pivoted upon the carriage 15 are the two bars 161, preferably suitably connected together and carrying at their free end a plate 163. A crank-arm 165, secured upon the rock-shaft 107, also engages one end of the plate 163. (See Figs. 10 and 11.) During a part of the movement of the carriage the plate 163 is out of engagement with the rack-bar; but as the carriage is drawn forward into printing position the plate 163 enters the slot 159 in the lower end of the rack-bar, and this plate is of sufficient length to be in engagement with said rack-bar when the carriage is in position to bring either set of type-wheels to the printing-point. An inking-ribbon 167, mounted upon suitable spools 169 171, is brought forward from one spool, is carried around a wire 173 in a slotted aliner-plate, hereinafter described, and is carried back to the other spool. The top wall of the casing at this point is provided with an opening 175, through which the paper is brought in contact with the inking-ribbon while it is directly over said type-wheels, and suitable pressure is applied to the paper to cause an impression from the type that are uppermost upon said wheels to be made upon said paper. The paper may be brought in contact with either the primary type-wheels or the total-result type-wheels. In listing checks, for instance, the amount of each check will be registered upon the primary type-wheels and will then be printed therefrom, and after all of the checks of one customer are thus listed the total amount of said listed checks will be printed from the total-result wheels. To print from the primary type-wheels, the carriage is drawn forward by the handle 17 and crank 19 the full limit of its movement. This movement of the carriage turns the primary type-wheels 47 so as to bring under the printing-ribbon the type on said wheels corresponding to the depressed keys. The end of the crank-arm 109 will now be over the slot or guideway 117, and a further movement of the handle 17 in a downward direction will rock the shaft 107, the roll 113 traveling downward in the guideway 117, (see Fig. 16), and through the crank-arm 165 and plate 163, which will now be in engagement with the slot 159 in the rack-bar 155, said rack-bar will be moved downward, the shaft 141 will be given a partial turn upon its axis, and the rolls and the paper will be turned from the position shown in Figs. 1, 5, and 10 to the position shown in Figs. 11 and 23, and the paper will be forced with considerable pressure against the uppermost row of type on said wheels. The inking-ribbon will be between the paper and the type, and thereby an inked impression of the type will be formed upon the paper. By reversing the movement of the handle and crank-arm the paper-carrying rolls will be turned back to the position shown in Fig. 1, and the amount printed upon the slip will then be visible to the operator right side up, as indicated in Fig. 1. The carriage may now be moved back to the rear end of the casing, during which operation the keys will be restored to their elevated position by means hereinafter described, and the machine will be in condition for recording the amount of the next check. When it is desired to print the total result from the total-result wheels, the total-result key 125, hereinbefore described, is operated to turn the switch-block 121 into the position shown in Fig. 17 of the drawings. The carriage is now drawn forward in the same manner as before, but is stopped when the roll 113 on the end of the crank-arm 109 strikes the switch-block 121. The roll 113 is now directly over the guideway 119, and the total-result wheels are in printing position. The handle and crank-arm 17 and 19 are then depressed and the printing operation takes place exactly as before, and the total amount of the listed checks will be printed on the slip below the columns of figures representing the amounts of the separate checks.

*The type-alining device.*—I prefer to provide means in connection with the printing device for positively alining the type that are turned into printing position in the operation of the machine. As here shown, the projecting portions of the wheels which bear the type are slightly curved, so as to make these projections of somewhat wedge form. A lever 177 is pivoted below the upper wall of the casing and is provided with the alining-bars 179, having a wedge-shaped opening between them. (See Figs. 22 and 23.) The shaft 141 is provided near the end which carries the pinion 162 with the cam 181. When the paper-carrying rolls 135 137 are in position, (shown in Fig. 1 of the drawings,) the cam 181 is in engagement with the end of the lever 177 and the alining-bars 179 are held in the elevated position shown in Fig. 22 of the drawings. When the shaft 141 is given a partial rotation in the printing operation, the cam 181 moves away from the lever 177 and a cam 183 engages a plate 185, carried by the other end of the lever, as shown in Figs. 22 and 23. The cam 183 now forces downward the end of the lever 177, carrying the alining-bars 179 down, one on each side of the uppermost tooth of each wheel. By this means, if the type are slightly out of line they will be brought into positive alinement just before the paper is pressed against the type, and the type impressions upon the paper will all be in line. It will be noted that the wire 173, about which the ribbon 167 passes, is also carried by the lever 177. The aliner is also provided with a slot 178', through which the rod 201, hereinafter described, passes. (See Figs. 20 and 28.)

*The paper-feed.*—For the purpose of feeding the paper I provide the shaft 136 of the roll 135 with a ratchet-wheel 187. (See Figs. 2, 7, and 23.) I also pivot upon the side of the casing the upright bar 189, adapted to move to a limited extent between the stops 191 and 193. A spring 195 engages this bar and tends to hold it against the stop 193. When the shaft 141 is rotated in the printing operation, one tooth of the ratchet 187 strikes the upper end of the bar 189 just before the paper is brought against the type. This causes the roll to be turned a distance equal to one tooth of the ratchet-wheel 187, and the further downward movement of the ratchet brings the ends of two of the ratchet-teeth against the edge of the bar 189, as shown in Fig. 23, and locks the roll against rotation.

*Means for preventing certain of the type from printing.*—It will be noted that when either set of type-wheels is brought into printing position those wheels that have not been rotated by the movement of the carriage in conjunction with the operated keys of the keyboard will have their zero-type uppermost, and if no means were employed for preventing it there would be a number of zeros printed at the left of the first figure of the printed number. To prevent this, I provide means for covering the type of the wheels above in consecutive order—those wheels that have been operated, (being, in fact, those wheels at the right-hand looking from the front of the machine in the drawings.) For this purpose I provide under the opening 175 in the top of the casing through which the printing is done a laterally-movable slide 197, which is open at its center, as shown in Fig. 29, and has hinged to one side the thin plate 199. This slide also carries the pointer or finder 201. A post 203 is arranged in suitable bearings 205 upon the inner wall of the casing, Figs. 10 and 29, and is provided with an arm 207, to which is connected a spring 209, the opposite end of the spring being connected to the wall of the casing. A wire 211, connected to the post 203, bears upon the end of the slide 197. (See Figs. 10 and 29.) Each of the type-wheels, both the primary type-wheels and the total-result wheels, has a hole 213 extending through it, preferably near its circumference. These holes are preferably directly under the zero-type, and a spring-actuated post tends to push the rod or finder 201 into these holes. If all of the wheels stand with the zero-type in printing position, these holes will all be in line and the rod 201 will be forced through all of them and all of the type will be covered by the plate 199. As soon, however, as any wheel has been turned so as to bring its hole 213 out of the path of the finder 201 said finder will be stopped by striking against the imperforate side of the wheel, and only the preceding wheels in the series will have their zero-type covered by the plate 199. The operation of this device is clearly illustrated in Figs. 28 and 29. In Fig. 28 the finder 201 is shown extending through three of the wheels and as abutting against the side of the fourth wheel and the plate 199 is shown covering the zero-type of the first three wheels. For withdrawing the finder 201 I provide a rotatable post 215, which has secured to it a collar 217, carrying an arm 219, that engages the slide 197. (See Fig. 29.) This collar also carries a pin 221, that engages an inclined slot 223 in a sliding plate 225, said plate being secured to and moving with the rack-bar 155. (See Fig. 10.) When the rack-bar 155 is moved upward at the end of the printing operation, the post 215 is turned and the slide 197 is drawn back against the tension of the spring 201, the finder 219 is drawn out of the holes in the type-wheels with which it may then be in engagement, if any, and the plate 199 is drawn back from over the type-wheels. The slide 197 and rod 201 will stand in this retracted position at all times, except during the printing operation. When the rack-bar 155 is depressed in the printing operation, the post 215 is turned and the arm 219 moves in position to permit the slide to be moved inward by the action of the spring 209.

*Ribbon-feed and shift.*—I also provide suitable means for feeding the ribbon and for shifting the feed so as to cause the feed device to operate in the opposite direction after the ribbon has been wound upon one spool. As here shown, the ribbon-spools 169 171, Figs. 1, 2, 5, and 7, are mounted upon suitable shafts 168, that project through the walls of the casing and have mounted upon their inner ends the ratchet-wheels 170. (See Fig. 10.) A vertical slide 172, carrying a dog 174 and upon its lower end a roll 176, is arranged between said ratchet-wheels. The dog 174 may be turned by means of a handle 178 upon the outside of the machine, so as to engage either of said ratchet-wheels. As the carriage is reciprocated the slide 172 is raised and it then falls by gravity, and this reciprocating movement of the slide turns the wheel with which the dog is in engagement, thereby winding the ribbon off from one spool and onto the other.

*Returning total-result wheels to zero.*—It will generally be necessary to turn the total-result wheels so as to bring the zero-type on each wheel uppermost or into printing position after each printing operation from these wheels. For this purpose the shaft 53, upon which the wheels are mounted, is provided with a suitable pinion 52. Except when the wheel 52 is to be operated for turning the total-result wheels back to zero it is locked by means of a lever 54, carrying a pin or projection that enters an opening in the wheel. (See Fig. 28.) This lever is pressed against the side of the wheel by means of a spring 56. A rod 58 is mounted in bearings, one of which is formed at the rear of the sliding carriage (see Fig. 6 of the drawings) and the other in the casing of the machine near the front end thereof. This rod is capable of a slight rocking movement, being adapted to be turned from the position shown in Fig. 30 to that shown in Fig. 31. The rod is provided with the short rack-bar 60, with the lug or projection 92, and with the projection 88. A vertically-sliding key-rod 84, carrying a key-button 86 on its upper end, (said button, as here shown, being located at the left of the main group of keys and being marked O in Fig. 5 of the drawings,) is provided with a notch 90, into which the projection 88 extends when the key-bar is in its elevated or normal position. A spring 82, connected to an arm 80 on the rod 58 and having its opposite end connected to any convenient point of the interior of the casing, tends to hold the rod 58 in the position shown in Fig. 30 of the drawings. The zero-key for the total-result wheels is then held in an elevated position and the rack-bar 60 is turned into an inclined position, as shown in Fig. 30. So long as the rod 58 remains in this position the reciprocatory movement of the carriage does not rotate the shaft 53. When, however, it is desired to set the total-result wheels back to zero, the key-bar 84 is depressed, thereby turning the rod 58 into the position shown in Fig. 31 of the drawings and bringing the projection 92 into position to engage the lever 54 and unlock the wheel 52. The key 86 and key-bar 84 are depressed when the carriage is at the forward limit of its movement. A backward movement of the carriage now causes the wheel 52 and shaft 53 to be rotated, and through the pins 57 on the total-result wheels and the dogs 59 on the disks 55, which are secured to the shaft 53. said total-result wheels are all brought back to zero or, in other words, into position with their zero-type uppermost or in printing position.

*Restoring keys to elevated position.*—Below the keyboard I prefer to provide a horizontal plate 4, Fig. 3, having a series of openings in it corresponding to the openings in the keyboard through which the key-bars 7 pass. This plate, together with the keyboard, forms means for guiding the keys and causing them to move vertically when they are depressed or elevated. A key-restoring frame 6 is arranged upon the plate 4 and is provided with a series of bars that extend longitudinally of the machine between the keys. This frame is provided with the laterally-extending pins 8, that project into inclined slots in the projections 10 on the plate 4. The frame 6 is also provided with the depending lug 12, one face of which is vertical and the other inclined. (See Fig. 3.) Arranged upon the forward end of the carriage 15 is the pivoted dog 14. When the carriage is moving forward, this dog strikes the lug 12 and the dog turns upon its pivot, so as to pass under said lug. This operation is illustrated in Fig. 12 of the drawings. When the carriage is moving in the opposite direction, the dog 14 engages the other face of said lug and causes the pins 8 to travel upward in the inclined slots in the projections 10, thereby raising the frame 6 while keeping it in a horizontal position, and the bars on said frame 6 engage the projections 9 on all of the keys that have been depressed and raise said keys into their uppermost or elevated positions, where they are held by the springs 11. The rear end of the plate 4 is preferably turned upward and is secured to a plate 18, depending from the top of the casing. When the frame 6 reaches substantially the limit of its upward movement, the dog 14 passes under the lug 12 and the frame immediately drops upon the plate 4.

*Repeat device.*—It is sometimes desirable to repeat one or more times the record of any number that has been set up by the primary or listing type-wheels. To accomplish this, it is only necessary to prevent the key-restoring device from operating and then to move the carriage back and forth and perform the printing and adding operations any desired number of times. For this purpose I provide the horizontal rod 227, mounted in a bearing in the forward part of the machine and supported also by passing through a bearing in the rear end of the reciprocating carriage. This rod is capable of a partial rotation upon its axis, and it is provided with a lug or projection 229. A key 231, provided with a button 233, is arranged preferably at the front of the keyboard, and by depressing this key the rod 227 may be turned partially upon its axis, thereby bringing the lug 229 into the path of the dog 14, causing said dog to be turned into a substantially-horizontal position and to pass under the lug 12. The keys will therefore remain in whatever position they were placed prior to the forward movement of the carriage, and operation of the machine in printing from the primary or listing wheels will be repeated. This operation may be continued as many times as desired.

*Operation:* The operation of the machine may be briefly described as follows: The carriage being at the rear of the casing and the parts of the machine being in the positions shown in Figs. 1, 2, 3, 5, and 6, the operator depresses in any preferred order the requisite keys on the keyboard to record any desired number. For instance, if it is desired to list a check for seven hundred and sixty-five dollars and forty-three cents the keys representing these numbers in the five right-hand rows are depressed, it being immaterial in what order they are operated. Then taking hold of the handle the operator draws the carriage forward in the casing. When it has been brought forward to the limit of its movement, the handle is depressed and the roll 113 on the crank-arm 109 travels down the guideway 117 and the printing mechanism is operated. During the forward movement of the carriage the depressed keys which stand in the path of the forwardly-moving spiral shafts cause said shafts to be turned on their axes, the number of revolutions given to each shaft depending on the position of the key by which it is operated. By this means the primary or listing type-wheels are turned so as to bring into printing position the type corresponding to the numbers on the depressed keys. As the handle 17 is depressed when the carriage reaches the end of its forward movement, the paper-carrying rolls, through the means hereinbefore described, are turned from the position shown in Figs. 1, 2, 5, and 10 to the position shown in Figs. 11 and 23 and the paper is pressed upon the type above the inking-ribbon and an impression from the type is formed upon the paper. During the printing operation the type are alined, and the zero-type beyond the type required to print the desired number are covered and prevented from printing by the means hereinbefore described. After the printing operation the handle is reversed and the carriage is moved back to the rear end of the machine. This operation restores the keys to their original position unless the "repeat-key" has been depressed. During the forward movement of the carriage the total-result type-wheels are in engagement with the transfer-wheels and rotate with said wheels and with the primary or listing wheels. During the reverse movement of the carriage the primary or listing wheels are returned to zero; but the total-result wheels are out of engagement with the transfer-wheels and are not reversed. After any desired number of amounts have been recorded the sum thereof may be printed on the slip by first operating the total-result key, which moves the switch-block 121, as hereinbefore described, and the carriage now stops with the total-result wheels in printing position, and by depressing the handle the sum of the previously listed or recorded numbers is printed on the slip. By depressing the key at the left hand of the keyboard the total-result wheels are turned to zero during the next backward movement of the carriage.
While I have described and shown a machine having a movable carriage carrying the type-wheels and connections and a stationary keyboard and printing device, it will be seen that the relation of these parts may be readily reversed and the keyboard and printing device placed upon the movable carriage, while the type-wheels and connecting devices are upon a stationary part. I wish, therefore, to be understood as including such a construction as an obvious mechanical equivalent for that shown and described. It will be obvious also that many details of the construction may be varied without departing from my invention.

Having thus described my invention, I claim as new and desire to secure by Letters Patent—

1. The combination, with a keyboard provided with a series of movable keys, of a series of type-wheels and connections and a support therefor, a transmitting mechanism thereon, said keyboard and said support with the parts thereon being relatively movable, to accomplish proportional movement of said type-wheels, for the purpose set forth.

2. The combination, with a movable carriage, a series of type-wheels mounted upon said carriage, and actuating devices therefor, of a series of movable keys for each type-wheel, selected keys, when moved, producing rotary movement in said actuating devices that is transmitted to corresponding type-wheels and causes said type-wheels to be turned, for the purpose set forth.

3. The combination, with a keyboard provided with a series of movable keys, of a series of type-wheels and a support therefor carrying a transmitting mechanism, and means for moving said type-wheel support along said keyboard and thereby causing said type-wheels to be operated by engagement with selected and previously-operated keys of said keyboard.

4. The combination, with a keyboard provided with a row of independent keys numbered from 1 to 9, of a sliding carriage, provided with a spiral shaft, in line with said keys and engageable with said keys, a type-wheel carried by said carriage, and connections between said type-wheel and said spiral shaft, whereby as said carriage is moved said type-wheel is rotated by engagement of said spiral shaft with any previously-operated key of said row.

5. The combination, with a keyboard provided with a series of movable keys, of a sliding carriage, a series of type-wheels mounted on said carriage, and a series of spiral shafts connected with said type-wheels, and adapted, as said carriage is moved, to engage previously-operated keys of said keyboard, for the purpose set forth.

6. The combination, with a reciprocating carriage, and type-wheels mounted thereon, of means for operating said wheels the same distance in both directions as said carriage is reciprocated, for the purpose set forth.

7. The combination, with a reciprocating carriage and type-wheels mounted thereon, of a stationary keyboard, movable keys on said keyboard, and means movable with relation to the keys causing said wheels to be turned by said keys, as said carriage is reciprocated, to bring into recording position type on said wheels corresponding to previously-moved keys, for the purpose set forth.

8. The combination, with a keyboard provided with a series of rows of numbered keys, of a reciprocating carriage, a series of spirally-grooved shafts mounted upon and carried by said carriage, said shafts being adapted to be rotated, as said carriage is moved, by engagement with previously-operated keys in respective rows of said keyboard, type-wheels connected with and rotated by said grooved shafts and means for recording the numbers registered on said type-wheels at each movement of said carriage, substantially as described.

9. The combination, with the keyboard and keys, of the movable carriage and the primary or listing and the total-result type-wheels both mounted upon said carriage, and means movable with said carriage for operating said wheels from previously-operated keys of said keyboard as said carriage is moved, substantially as described.

10. The combination, with the keyboard provided with a series of rows of numbered keys, of a reciprocating carriage, a series of spirally-grooved shafts mounted upon and carried by said carriage, said shafts being held against longitudinal movement in said carriage but adapted to be rotated as said carriage is moved by engagement with previously-operated keys of said keyboard, and a series of type-wheels connected with and rotated by said spirally-grooved shafts, for the purpose set forth.

11. The combination, with the keyboard and keys, of the movable carriage, the listing type-wheels and the total-result type-wheels mounted thereon, transfer-wheels between said listing-wheels and total-result wheels, and means for moving said total-result wheels into engagement with said transfer-wheels during one movement of said carriage, and holding them out of engagement with said transfer-wheels during the other movement of said carriage, for the purpose set forth.

12. The combination, with the listing-wheels, the total-result wheels and the interposed transfer-wheels, of means for rotating said listing-wheels, means for axially moving said transfer-wheels for the purpose of carrying from each total-result wheel to the wheel of the next higher denomination, and means for moving said total-result wheels into and out of engagement with said transfer-wheels, for the purpose set forth.

13. The combination, with the listing-wheels, the total-result wheels and the interposed transfer-wheels, of means for rotating said listing-wheels, and means for moving said total-result wheels into and out of engagement with said transfer-wheels, for the purpose set forth to be moved by or permit the independent rotation of said transfer-wheels.

14. The combination, with the keyboard and keys, of the movable carriage, the listing-wheels, the total-result wheels, and the interposed transfer-wheels, all mounted upon said carriage, means operated by said keys for rotating said listing-wheels, and means for moving said total-result wheels into and out of engagement with said transfer-wheels, for the purpose set forth.

15. The combination, with the keyboard and keys, of the movable carriage, the listing-wheels and the total-result wheels mounted upon said carriage, means operated by said keys for rotating said listing-wheels, means for transferring indicated amounts from said listing-wheels to said total-result wheels, and means for printing the indicated amounts from either the listing or total-result wheels.

16. The combination, with the keyboard and keys, of the movable carriage, the listing, the total-result and the interposed transfer wheels, all mounted upon said carriage, means operated by said keys for rotating said listing-wheels, means for moving said total-result wheels into and out of engagement with said transfer-wheels, means for axially moving said transfer-wheels while engaged by said total-result wheels, for carrying from one of said total-result wheels to the total-result wheel of the next higher denomination, and means for returning said transfer-wheels to their former axial position while not engaged by said total-result wheels.

17. The combination, with the listing type-wheels, of the total-result type-wheels, the interposed transfer-wheels mounted upon movable supports, means for moving said total-result wheels into and out of engagement with said transfer-wheels, and means for axially moving any one or more of said transfer-wheels for the purpose of carrying from any one of said total-result wheels to the total-result wheel of the next higher denomination.

18. The combination, with the listing type-wheels of means for alternately showing sums thereon and returning the same to zero, the total-result type-wheels, and the interposed transfer-wheels mounted upon movable supports, and adapted to communicate movement to said total-result wheels, for the purpose set forth.

19. The combination, with the listing type-wheels, of the total-result wheels, the interposed transfer-wheels mounted upon movable supports, and means for moving said total-result type-wheels into and out of engagement with said transfer-wheels, for the purpose set forth.

20. The combination, with the listing type-wheels and the total-result type-wheels, of the interposed transfer-wheels, movable standards upon which said transfer-wheels are mounted, springs engaging said standards, locking means for holding said standards in position against the tension of said springs, and means upon each of said total-result wheels for releasing the next successive transfer-wheel as each total-result wheel makes a complete revolution, for the purpose set forth.

21. The combination, with the listing-wheels 47 and means for operating said wheels, of the total-result wheels 49, the interposed transfer-wheels 75, the movable standards in which said transfer-wheels are mounted, means for moving said standards and thereby axially moving said transfer-wheels, levers 95 for holding said standards and wheels in normal position, and means upon said total-result wheels for tripping said levers, for the purpose set forth.

22. The combination, with the listing type-wheels 47 and means for operating said wheels, of the total-result wheels 49, the transfer-wheels 75, means for moving said total-result wheels into and out of engagement with said transfer-wheels, movable standards 79 in which said transfer-wheels are mounted, springs 99 connected to said standards, locking-levers 95, means upon said total-result wheels for tripping said locking-levers and permitting them to be moved by said springs, and means for restoring said standards to their normal position, substantially as described.

23. The combination, with the movable carriage, of the listing type-wheels and the total-result type-wheels mounted upon said carriage, the interposed transfer-wheels, means for moving said total-result wheels into engagement with said transfer-wheels while said carriage is being moved in one direction, means for moving said total-result wheels out of engagement with said transfer-wheels while said carriage is being moved in the opposite direction and means for axially moving said transfer-wheels while said total-result wheels are in engagement with them and means for restoring said transfer-wheels to their normal position while said total-result wheels are out of engagement with them, for the purpose set forth.

24. The combination, with the type-wheels and means for operating them, the carriage whereon the same are arranged, the type-alining device adapted to engage the type of said wheels, the movement of said carriage operating said type-wheels and moving them into position to be engaged by said alining device and means for operating said alining device, for the purpose set forth.

25. The combination, with the movable carriage, the listing type-wheels and the total-result type-wheels carried thereby, and means for moving said carriage and thereby bringing either set of wheels into printing position, and an alining device adapted to engage and aline the type of the set of wheels that is brought into printing position.

26. The combination, with the movable carriage, of the listing type-wheels and the total-result type-wheels carried thereby, an alining device common to both sets of wheels, and means for moving said carriage so as to bring either set of said type-wheels into position to be engaged by said alining device, for the purpose set forth.

27. The combination, with the movable carriage, the listing type-wheels and the total-result wheels carried thereby, of an impression device common to both sets of type-wheels, means for moving said carriage into position to bring type on either set of wheels into position to be engaged by said impression device.

28. The combination, with the movable carriage, type-wheels carried thereby, and means for moving said carriage so as to bring said type-wheels into printing position, of the slide 197 carrying a plate 199 adapted to cover the type that are in printing position and are not to be printed from, and means for regulating the movement of said slide, for the purpose set forth.

29. The combination, with the series of type-wheels each provided with a transverse hole 213, of the movable slide 197 carrying the plate 199 and the pin 201 adapted to enter the holes in said type-wheels, and means for moving said slide.

30. The combination, with the type-wheels, and means for bringing said type-wheels into printing position, of the diagonally-arranged shaft 141 and the paper-carrying and impression rolls operated by said shaft, for the purpose set forth.

31. The combination, in a computing-machine, of the keys and a transmitting mechanism, with the total-result type-wheels, the carriage, said keys and transmitting mechanism coöperating upon the movement of said carriage to operate said type-wheels, and means for restoring said total-result type-wheels to zero, substantially as described.

32. The combination, with the carriage, of the listing and total-result wheels mounted upon said carriage, means for operating said wheels, and means for restoring said total-result wheels to zero.

33. The combination, with the carriage, of the total-result wheels, the shaft 53 upon which said wheels are mounted and revolve, dogs carried by said shaft, adapted as the shaft is rotated, in one direction, to engage projections on said wheels, means upon said carriage for supporting said shaft, and means adapted to be thrown into engagement with said shaft to rotate it as said carriage is moved, for the purpose set forth.

34. The combination, of the total-result wheels, mounted on a rotatable shaft upon a movable carriage, means causing said wheels to move with the shaft as it is rotated in one direction, a pinion upon said shaft, a rack-bar adapted to be moved into and out of the path of said pinion, and a key for so moving said rack-bar, for the purpose set forth.

35. The combination of the type-wheels, the tubular shafts to which said wheels are secured, said shafts being arranged one within another, standards 39 and 41 supporting said shaft and means for rotating said shafts.

36. The combination of the type-wheels, the tubular shafts upon which said wheels are mounted, said shafts arranged one within another, independent bearings for each shaft, worm-wheels upon said shafts, spiral shafts engaging said worm-wheels, a movable carriage upon which said tubular shafts and type-wheels and said spiral shafts and connections are mounted, and a series of keys adapted to be moved into the paths of said spiral shafts for the purpose set forth.

37. The combination, with the movable carriage, of type-wheels arranged upon tubular shafts that are mounted one within another upon said carriage, spiral shafts also mounted upon said carriage and engaging worm-wheels on said tubular shafts, a keyboard and a series of numbered keys arranged in line with each spiral shaft, and means for moving said carriage.

38. The combination, in a computing-machine, of the keyboard, with the plurality of series of keys thereon, catches for normally holding the keys in an elevated position, a movable carriage, a plurality of transmitting devices therein corresponding to the series of keys, figured wheels coupled with said transmitting devices, said transmitting devices and said wheels being operated upon the movement of the carriage after the keys have been set, and means positively actuated by said carriage for restoring set or depressed keys to their normal positions, substantially as described.

39. The combination, in a computing-machine, of the frame, with the keyboard, the plurality of series of keys thereon, the carriage provided within said frame and provided with a plurality of transmitting devices, all movable with and by said carriage, said keys adapted to engage with said transmitting devices, and figured wheels operable by said transmitting devices when said carriage is moved a given distance, substantially as described.

40. The combination, with the keyboard, the series of depressible keys, and the movable frame adapted to engage the depressed keys, of the sliding carriage, and means on said carriage to positively engage and move said frame and restore said keys, for the purpose set forth.

41. The combination, with the casing, of the movable carriage mounted therein, the rock-shaft mounted in bearings upon said carriage, an operating-handle connected with said rock-shaft, a crank-arm connected with said rock-shaft, a guideway in which the end of said arm travels, transverse guideways connected with the main guideway, a switch-block arranged at the junction of one of the transverse guideways and the main guideway, and a key for operating said switch-block.

42. The combination, with the type-wheels and the spiral operating-shafts, of the spring-controlled locking-plates adapted to engage and lock said spiral shafts, for the purpose set forth.

43. The combination, with a keyboard provided with a series of movable keys, of a series of type-wheels and a support therefor, a transmitting mechanism on the type-wheel support, said keyboard and said support, with the parts thereon, being relatively movable to accomplish proportional movement of said type-wheels and the return thereof to zero, for the purpose set forth.

44. The combination, in a computing-machine, of a keyboard provided with a plurality of series of movable keys, a series of type-wheels, one for each series of keys, a transmitting mechanism operable by selected keys when said keyboard and transmitting mechanism are relatively moved and communicating proportional movement to said type-wheels.

45. The combination, in a computing-machine, of a key, with a transmitting mechanism, a figured wheel operatively connected with said transmitting mechanism, said key adapted for indicative operation without operating said transmitting mechanism, and means for producing relative movement between said key and transmitting mechanism and thereby operating said wheel.

46. The combination, in a computing-machine, of a key, with a transmitting mechanism, a figured wheel operatively connected with said transmitting mechanism, and means, independent of the selective or indicative movement of said key, producing relative movement between the same and said transmitting mechanism, by which movement the latter and said wheel are operated by said key.

47. The combination, in a computing-machine, of a key, with a transmitting mechanism, a figured wheel operatively connected with said transmitting mechanism, and means, independent of the selective or indicative movement of said key, producing relative movement between the same and said transmitting mechanism, by and during which movement the latter and said wheel are operated through the engagement of said key and the transmitting mechanism.

48. The combination, in a computing-machine, of a series of keys, with a transmitting mechanism, a figured wheel for operation by said transmitting mechanism, said transmitting mechanism adapted for engagement with a selected key of said series, and means for producing relative movement between said key and transmitting mechanism after the engagement thereof, causing said wheel to be turned in proportion to the denomination of said key.

49. The combination, in a computing-machine, of a key, with a transmitting mechanism, a figured wheel for operation by said transmitting mechanism, said key and transmitting mechanism adapted for engagement without operating said transmitting mechanism or said wheel, and means for producing relative movement between said key and transmitting mechanism whereby the latter and said wheel are rotated, substantially as described.

50. The combination, in a computing-machine, of a key, with a transmitting mechanism, a figured wheel permanently connected with said transmitting mechanism for operation thereby in both directions, said key adapted for selective or indicative movement without operating said transmitting mechanism, and means for producing relative movement between said key and transmitting mechanism to actuate said transmitting mechanism thereby and first operate and then return said figured wheel, substantially as described.

51. In a computing-machine, the combination, with a keyboard provided with a plurality of sets or rows of keys, a transmitting-shaft for each row of keys and operative upon relative movement between the same and a selected key of its row, figured wheels connected with said shafts, and means for producing relative movement between the shafts and the keyboard, thereby operating transmitting shafts and wheels corresponding to selected keys.

52. The combination, with the keyboard provided with a series of rows of numbered keys, of a reciprocating carriage, a series of spirally-grooved shafts revoluble in and movable longitudinally with said carriage, said shafts adapted for rotation by selected keys during the movement of said carriage, the rotation of said shafts being proportional to the denominations of previously operated or selected keys, and a series of type-wheels operated by said shafts.

53. The combination, with the keyboard provided with a series of rows of numbered keys, of a reciprocating carriage, a series of spirally-grooved shafts revoluble in and movable longitudinally with said carriage, said shafts adapted for rotation by selected keys during the movement of said carriage, the rotation of said shafts being proportional to the denominations of previously operated or selected keys, and a series of type-wheels movable with said carriage and operable by the said shafts thereon.

54. The combination, with the figured wheel, of the rotary shaft for operating the same, a key, means for producing relative movement between said shaft and key to operate said shaft, locking means, said locking means preventing the rotation of said shaft except during the engagement thereof by a key, substantially as described.

55. The combination, with the spiral transmitting-shaft, of the type-wheel operable thereby, a series of keys, a locking device for said shaft operable by a key of said series, and means operable after a key movement producing movement of said shaft and said wheel in proportion to the denomination of said key.

56. In a computing-machine, the combination, with the key, of the transmitting mechanism, the type-wheel for operation by the latter, and a locking device for said transmitting mechanism preventing the operation thereof save by a key, substantially as described.

57. In a computing-machine, the combination, with the keyboard, of a carriage movable with respect thereto, the transmitting devices upon and movable with said carriage, coöperating with keys of said keyboard to produce computations, and the locking devices movable with said transmitting devices operable by the keys of said keyboard and preventing independent movement of said transmitting devices, substantially as described.

58. The combination, in a computing-machine, of a suitable frame or casing, a keyboard and keys thereon, a carriage movable within said casing, transmitting mechanisms within said casing coöperating with said keys, two sets of type-wheels provided upon said carriage and operable by said transmitting mechanism, said casing provided with a single printing device automatically operable upon either of said sets of type-wheels, substantially as described.

59. The combination, with the listing type-wheels and the total-result type-wheels, of the interposed transfer-wheel mounted upon movable supports, for the purpose set forth.

60. The combination, with the temporary or listing wheels, and the total-result wheels, of interposed transfer-wheels, capable of both rotary and bodily movement, and means for producing said bodily movement simultaneously with the rotary movement, to communicate two steps to a total-result wheel, during one step of a temporary or listing wheel.

61. The combination, with the listing type-wheels, of means for alternately showing sums thereon and returning the same to zero, of total-result type-wheels, the interposed transfer-wheels mounted upon movable supports, and means for disengaging the total-result type-wheels during the return movement of the listing type-wheels, substantially as described.

In testimony whereof I have hereunto placed my hand this 4th day of September, 1899.

WILLIAM P. SHATTUCK.

In presence of—
A. C. PAUL,
M. C. NOONAN.